US012149640B2

(12) United States Patent
Hori

(10) Patent No.: US 12,149,640 B2
(45) Date of Patent: Nov. 19, 2024

(54) TECHNIQUE FOR PROTECTING SECRET INFORMATION OF AUTHENTICATION-TARGET APPARATUS

(71) Applicant: CANON KABUSHIKI KAISHA, Tokyo (JP)

(72) Inventor: Kenjiro Hori, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 17/732,624

(22) Filed: Apr. 29, 2022

(65) Prior Publication Data

US 2022/0368543 A1 Nov. 17, 2022

(30) Foreign Application Priority Data

May 12, 2021 (JP) .................................. 2021-081200

(51) Int. Cl.
*H04L 9/32* (2006.01)
*H04L 9/08* (2006.01)
(52) U.S. Cl.
CPC .......... *H04L 9/3271* (2013.01); *H04L 9/0838* (2013.01); *H04L 9/0869* (2013.01); *H04L 9/0891* (2013.01)
(58) Field of Classification Search
CPC ... H04L 9/3271; H04L 9/0838; H04L 8/0869; H04L 9/0891
See application file for complete search history.

(56) References Cited

U.S. PATENT DOCUMENTS 9,166,800 B2 10/2015 Itoh et al.
9,405,920 B1 * 8/2016 Roth ................... G06F 21/645
(Continued)

FOREIGN PATENT DOCUMENTS

JP 5064003 B2 10/2012
JP 2019075774 A 5/2019
(Continued)

OTHER PUBLICATIONS

Skorobogatov "How microprobing can attack encrypted memory", In Proceedings of Euromicro Conference on Digital System Design, AHSA 2017 Special Session. IEEE Computer Society, 2017: pp. 1-8. Cited in the specification.

*Primary Examiner* — Phy Anh T Vu
(74) *Attorney, Agent, or Firm* — ROSSI, KIMMS & McDOWELL LLP

(57) ABSTRACT

An authentication system for authenticating an authentication-target apparatus by transmitting challenge data from an authenticating apparatus to the authentication-target apparatus and transmitting response data from the authentication-target apparatus to the authenticating apparatus. The authentication-target apparatus updates ae secret key and an encrypted original key stored in a memory using a new secret key and a new encrypted original key, derives an authentication key based on an original key, and generates the response data based on a challenge data received from the authenticating apparatus and the authentication key. The authentication apparatus derives an authentication key based on identification information of the authentication-target apparatus and an authentication original key, generates response data for verification based on the challenge data and the authentication key, and obtains an authentication result.

21 Claims, 10 Drawing Sheets

(56) References Cited

U.S. PATENT DOCUMENTS

| | | |
|---|---|---|
| 11,082,214 B2 | 8/2021 | Yasaki et al. |
| 2009/0292918 A1 | 11/2009 | Mori et al. |
| 2012/0221863 A1* | 8/2012 | Osaka ................. G06F 21/34 |
| | | 713/189 |
| 2017/0300008 A1* | 10/2017 | Lee ................. G03G 21/1882 |
| 2018/0167393 A1* | 6/2018 | Walrant ............... H04L 63/101 |
| 2018/0205561 A1* | 7/2018 | Le Saint ............. H04L 9/3268 |
| 2019/0014114 A1* | 1/2019 | Beddus ............... H04L 9/3273 |
| 2019/0238346 A1* | 8/2019 | Perlman ............... H04L 9/3271 |
| 2019/0320084 A1* | 10/2019 | Foley ................ G03G 15/0863 |
| 2020/0034554 A1* | 1/2020 | Enomoto ............. H04W 12/06 |
| 2020/0195641 A1* | 6/2020 | Trivelpiece ........ H04L 63/0876 |

FOREIGN PATENT DOCUMENTS

| | | |
|---|---|---|
| JP | 2020088726 A | 6/2020 |
| WO | 2012120671 A1 | 9/2012 |

* cited by examiner

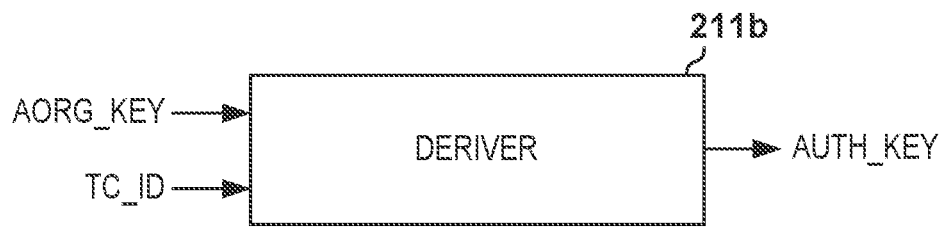
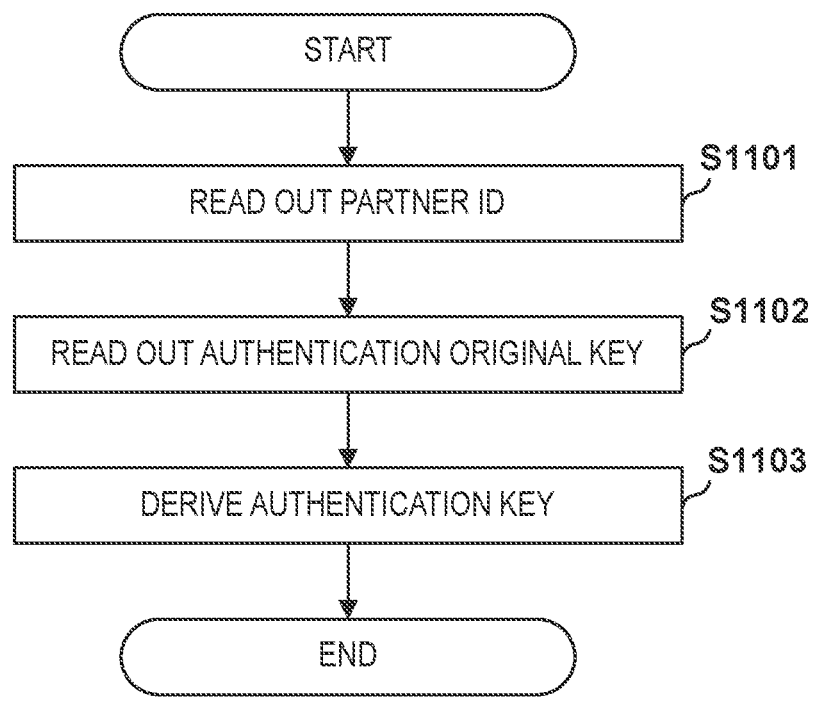

TECHNIQUE FOR PROTECTING SECRET INFORMATION OF AUTHENTICATION-TARGET APPARATUS

BACKGROUND OF THE INVENTION

Field of the Invention

The present invention relates to a technique for protecting the secret information of an authentication-target apparatus.

Description of the Related Art

When a component is not envisioned in the design to be connected to an electronic device such as an image forming device, the electronic device may malfunction or unexpected events may occur due to the connection of the component. US-2009-0292918 discloses a method of performing challenge-response authentication using a secret cryptographic key (authentication key) to identify whether a battery pack is genuine.

Incidentally, an authentication-target apparatus to be authenticated by an authenticating apparatus is made into a Large Scale Integrated Circuit (LSI) chip and is made tamper-resistant to prevent secret information from being exposed from the LSI chip. On the other hand, according to Sergei Skorobogatov, United Kingdom, "How microprobing can attack encrypted memory", in the Proceedings of Euromicro Conference on Digital System Design, AHSA 2017 Special Session, Vienna, Austria, IEEE Computer Society, 2017, a microprobing attack is introduced to expose secret information from non-volatile memory in LSI chips. Therefore, the tamper resistance of the authentication-target apparatus is threatened by microprobing attacks.

If the secret information is exposed by the authentication-target apparatus, a counterfeit product with the exposed secret information written therein may be created, and an electronic device to which the counterfeit product is connected may malfunction. What is needed, therefore, is the emergence of a method for defending against microprobing attacks.

SUMMARY OF THE INVENTION

A first aspect of the present invention provides an authentication system for authenticating an authentication-target apparatus by transmitting challenge data from an authenticating apparatus to the authentication-target apparatus and transmitting response data from the authentication-target apparatus to the authenticating apparatus, wherein the authentication-target apparatus comprises: first non-volatile memory that stores a secret key of the authentication-target apparatus and an encrypted original key generated by encrypting an original key using the secret key; a first decryptor that reproduces the original key by decrypting the encrypted original key using the secret key stored in the first non-volatile memory; first volatile memory that temporarily holds the original key; a first random number generator that generates a random number; a first encryptor that generates a new encrypted original key by encrypting the original key using the random number as a new secret key; and a first processor configured to update the secret key and the encrypted original key stored in the first non-volatile memory using the new secret key and the new encrypted original key, derive an authentication key based on the original key held in the first volatile memory, and generate the response data based on the challenge data received from the authenticating apparatus and the authentication key, and the authenticating apparatus comprises: second non-volatile memory that stores a secret key of the authenticating apparatus and an encrypted original key generated by encrypting an original key using the secret key; a second decryptor that reproduces the original key by decrypting the encrypted original key using the secret key stored in the second non-volatile memory; second volatile memory that temporarily holds the original key; a second random number generator that generates a random number; a second encryptor that generates a new encrypted original key by encrypting the original key using the random number as a new secret key; and a second processor that updates the secret key and the encrypted original key stored in the second non-volatile memory using the new secret key and the new encrypted original key, derives an authentication key based on the original key held in the second volatile memory, generates response data for verification based on the challenge data and the authentication key, and obtains an authentication result based on the response data transmitted from the authentication-target apparatus and the response data for verification.

A second aspect of the present invention provides an authentication system for authenticating an authentication-target apparatus by transmitting challenge data from an authenticating apparatus to the authentication-target apparatus and transmitting response data from the authentication-target apparatus to the authenticating apparatus, wherein the authentication-target apparatus comprises: first non-volatile memory that stores a secret key of the authentication-target apparatus and an encrypted original key generated by encrypting an original key using the secret key; a first decryptor that reproduces the original key from the secret key and the encrypted original key stored in the first non-volatile memory; first volatile memory that temporarily holds the original key; a first random number generator that generates a random number; a first encryptor that generates a new encrypted original key by encrypting the original key using the random number as a new secret key; and a first processor that updates the secret key and the encrypted original key stored in the first non-volatile memory using the new secret key and the new encrypted original key, derives an authentication key based on the original key held in the first volatile memory, and generates the response data based on the challenge data received from the authenticating apparatus and the authentication key, and the authenticating apparatus comprises: second non-volatile memory that stores an authentication original key serving as a source for deriving the authentication key; and a second processor that derives the authentication key based on identification information of the authentication-target apparatus and the authentication original key stored in the second non-volatile memory, generates response data for verification based on the challenge data and the authentication key, and obtains an authentication result based on the response data transmitted from the authentication-target apparatus and the response data for verification.

Further features of the present invention will become apparent from the following description of exemplary embodiments (with reference to the attached drawings).

BRIEF DESCRIPTION OF THE DRAWINGS

FIG. 10 is a diagram illustrating operations of a deriver.

FIG. 11 is a flowchart illustrating a method of deriving an authentication key.

DESCRIPTION OF THE EMBODIMENTS

Figure 1:
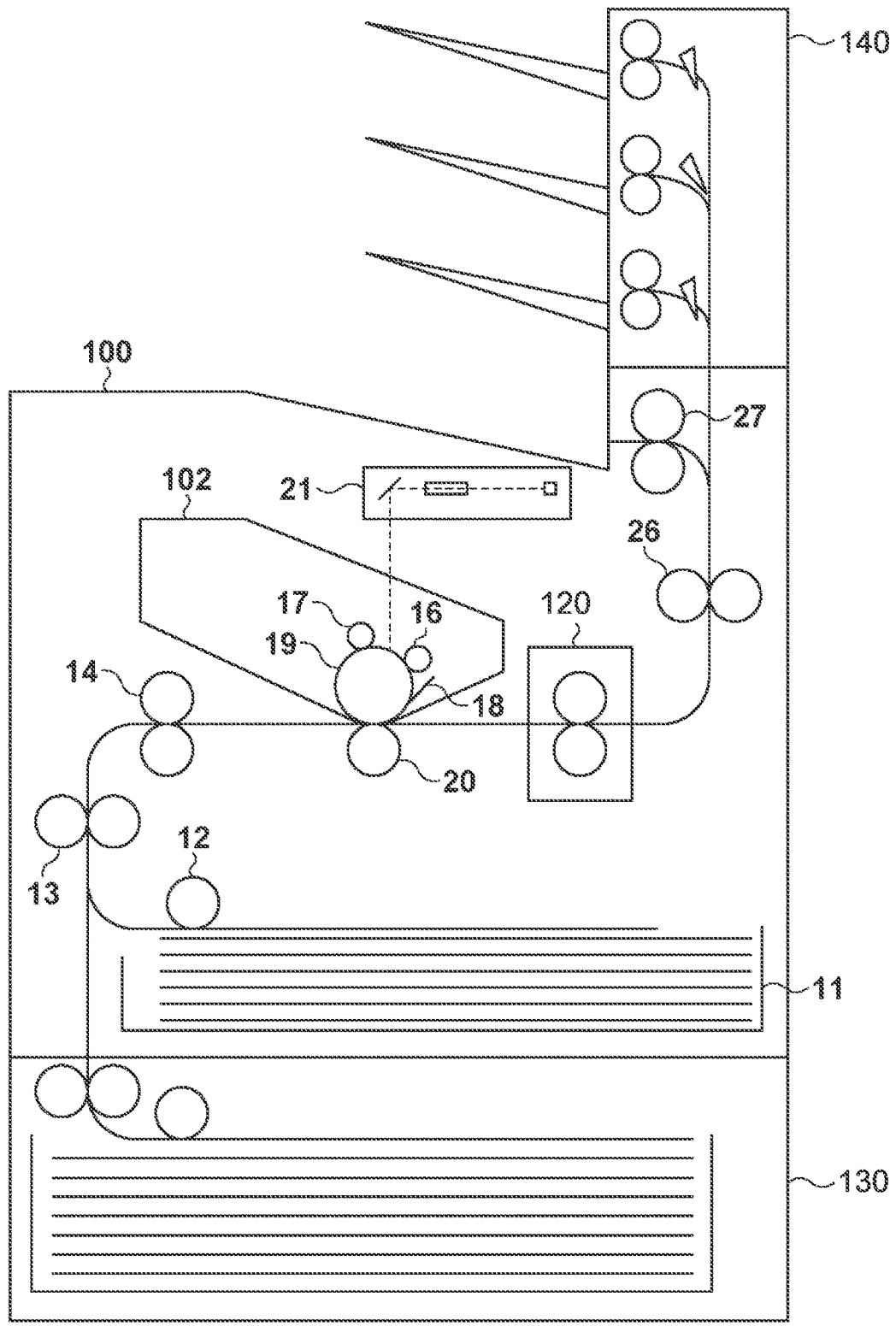
FIG. 1 is a diagram illustrating an image forming device.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Image Forming Device (Authentication System)

FIG. 1 illustrates an image forming device 100, an optional paper feed device 130, and an optional paper discharge device 140. The image forming device 100 is a printer, a copier, a multifunction peripheral, or the like that forms images on sheets through an electrophotographic process. A charging roller 16 uniformly charges the surface of a photosensitive drum 19. An exposure unit 21 includes a light-emitting device (e.g., a laser diode, a light-emitting diode, or an organic electroluminescence device), and irradiates the surface of the photosensitive drum 19 with light to form an electrostatic latent image. A developing roller 17 causes toner to adhere to the electrostatic latent image to form a toner image. A paper feed unit 12 includes a pickup roller that feeds a sheet from a sheet loading unit 11 into a conveyance path. Conveyance rollers 13 and 14 conveyance the sheet through the conveyance path. The sheet is conveyed to a transfer nip part formed by a transfer roller 20 and the photosensitive drum 19. The transfer roller 20 transfers the toner image from the photosensitive drum 19 onto the sheet. A cleaner 18 cleans the surface of the photosensitive drum 19.

The sheet onto which the toner image has been transferred is conveyed to a fixer 120. The fixer 120 has a fixing roller and a pressure roller, and applies heat and pressure to the sheet and the toner image to fix the toner image onto the sheet. A conveyance roller 26 and a discharge roller 27 convey the sheet and discharge the sheet out of the image forming device 100.

Here, a process cartridge 102 is constituted by the photosensitive drum 19, the charging roller 16, the developing roller 17, and the cleaner 18 as a single integrated unit, and is a replaceable component that can be attached to and removed from the image forming device 100. The fixer 120 is also a replaceable component that can be attached to and removed from the image forming device 100. The optional paper feed device 130 is a device provided to increase the sheet loading capacity and can be attached to and removed from the image forming device 100. The optional paper discharge device 140 is a device that sorts and ejects the sheets onto which images have been formed, and can be attached to and removed from the image forming device.

Figure 2:
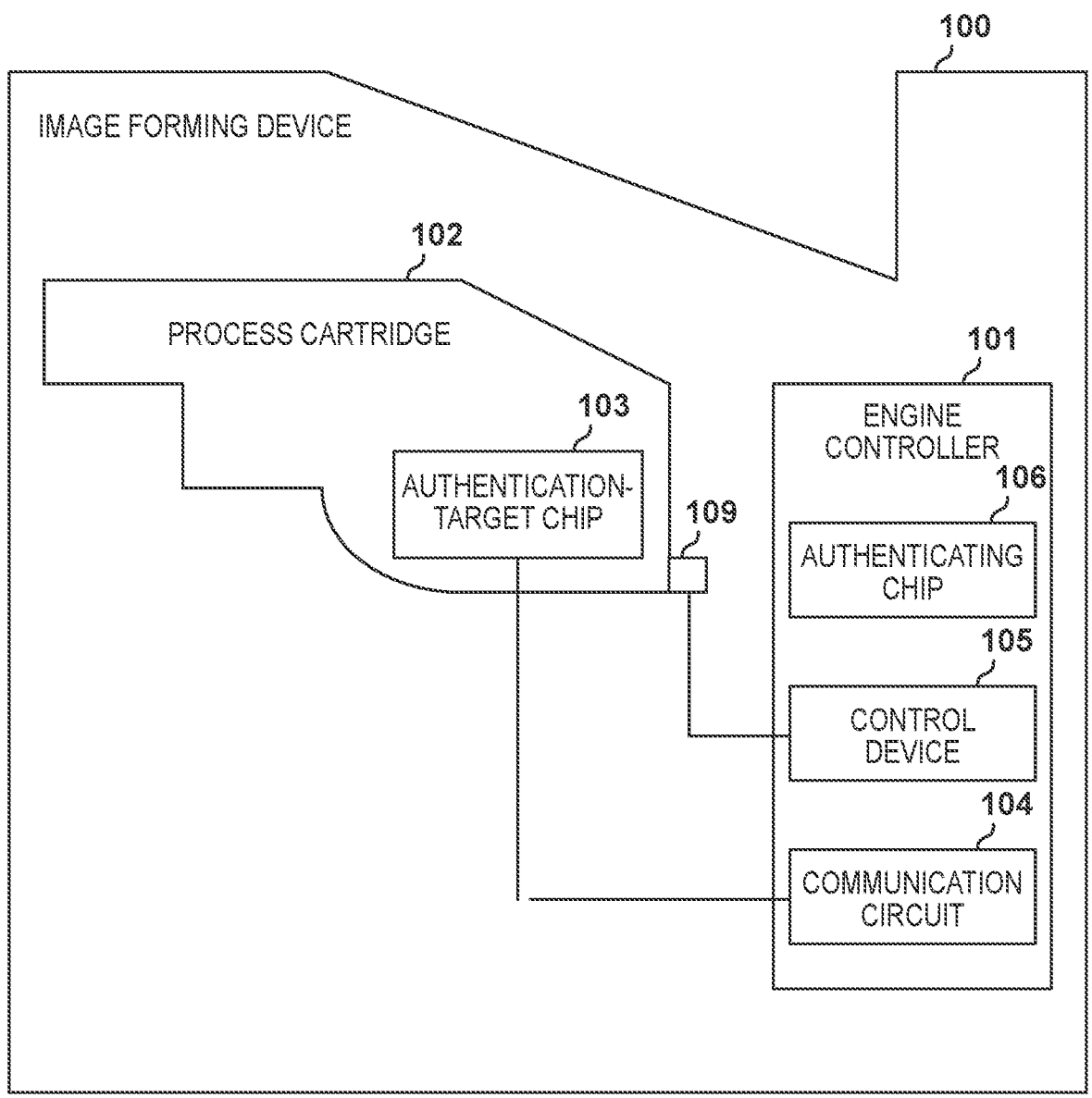
FIG. 2 is a diagram illustrating an authentication system.

FIG. 2 illustrates the process cartridge 102 provided with an authentication-target chip 103. An engine controller 101 has a control device 105, an authenticating chip 106, and a communication circuit 104. The control device 105 is a controller (e.g., a CPU (processor), a microcomputer) that comprehensively controls the entire image forming device 100. The authenticating chip 106 is a semiconductor integrated circuit that authenticates the authentication-target chip 103. The authentication-target chip 103 is also a semiconductor integrated circuit. The communication circuit 104 is a communication circuit for communicating with the process cartridge 102. The process cartridge 102 has the authentication-target chip 103. The authentication-target chip 103 is a tamper-resistant chip. The control device 105 detects that the process cartridge 102 has been mounted to the image forming device 100 using a mounting sensor 109. When the mounting sensor 109 detects the process cartridge 102, the control device 105 instructs the authenticating chip 106 to perform authentication. The control device 105 transmits a challenge generated by the authenticating chip 106 to the authentication-target chip 103 via the communication circuit 104. The control device 105 receives a response from the authentication-target chip 103 via the communication circuit 104 and transfers the response to the authenticating chip 106. The control device 105 receives an authentication result from the authenticating chip 106. The authentication-target chip 103 is incorporated into at least one of a consumable or a replaceable component of the image forming device 100 (e.g., the fixer 120) and an optional device (e.g., the optional paper feed device 130 and paper discharge device 140 or the like).

Figure 3:
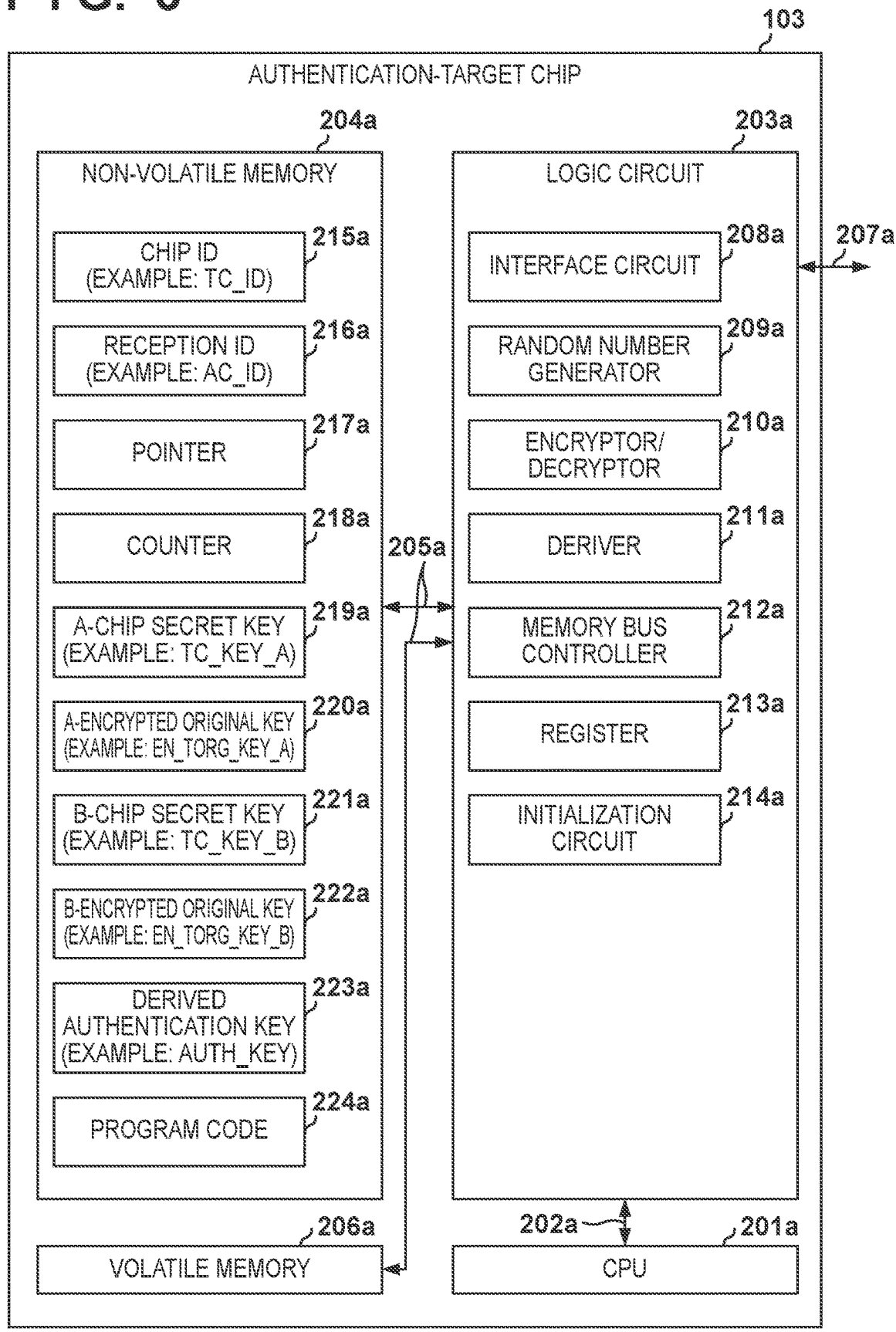
FIG. 3 is a diagram illustrating an authentication-target chip.
Figure 4:
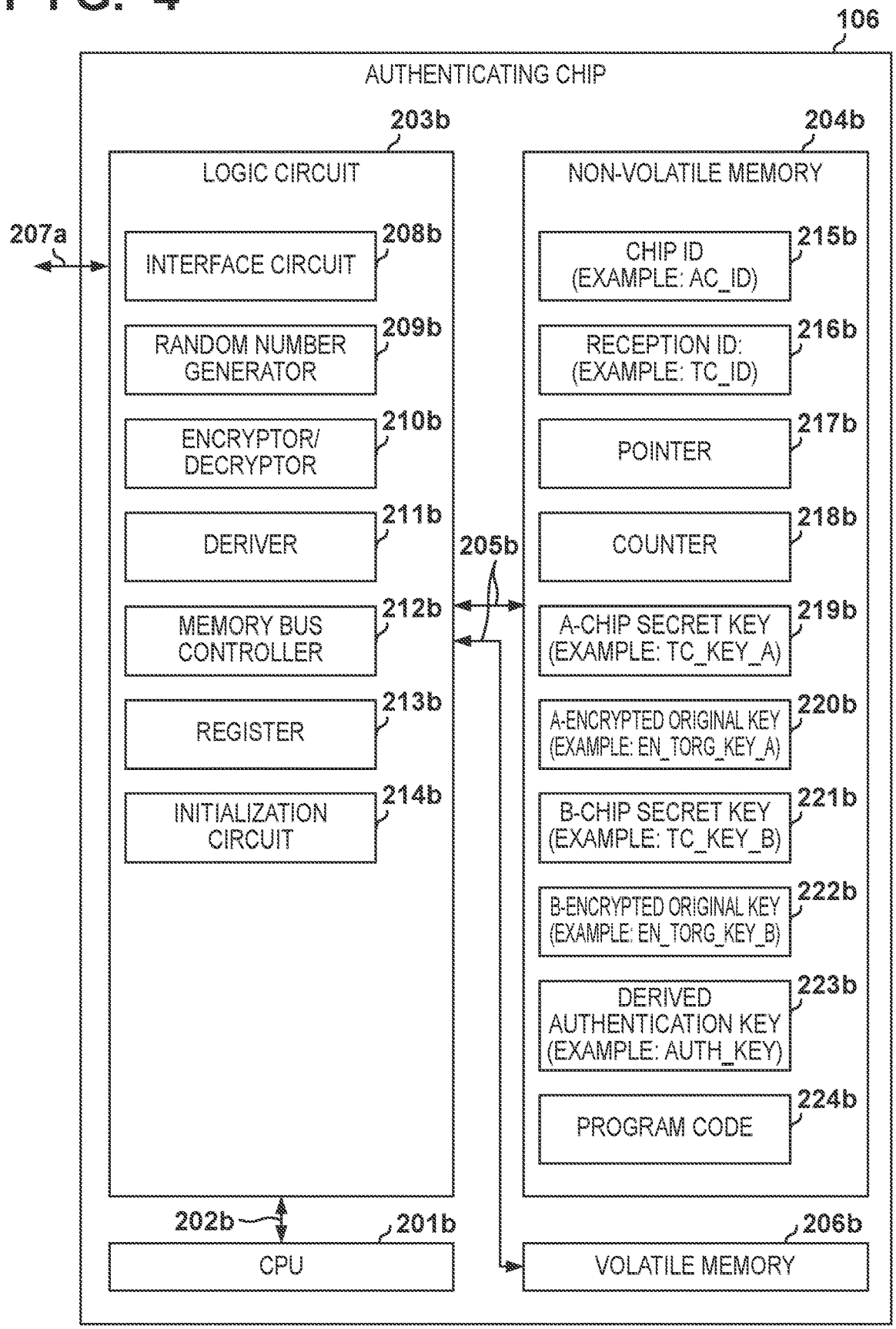
FIG. 4 is a diagram illustrating an authenticating chip.

FIG. 3 illustrates the internal configuration of the authentication-target chip 103. FIG. 4 illustrates the internal configuration of the authenticating chip 106. The first embodiment assumes that the authentication-target chip 103 and the authenticating chip 106 have the same hardware configuration, aside from the information and program code stored therein. In the following descriptions, the same or similar constituent elements are given the same reference signs. Subscripts a and b may be added to the end of the reference signs to distinguish the authentication-target chip 103 from the authenticating chip 106. For example, "CPU 201a" indicates a CPU 201 of the authentication-target chip 103. "CPU 201b" indicates a CPU 201 of the authenticating chip 106.

As illustrated in FIG. 3, the authentication-target chip 103 has the CPU 201a, a CPU bus 202a, a logic circuit 203a, non-volatile memory 204a, a memory bus 205a, volatile memory 206a, and an external interface 207a.

The CPU 201a, for example, is a 32-bit bus width Central Processing Unit (CPU). The memory bus 205a and the CPU bus 202a include a data bus and an address bus. The data bus has a bus width of 32×2=64 bits for data input and output. The CPU 201a communicates with the logic circuit 203a via the CPU bus 202a. Furthermore, the CPU 201a accesses the non-volatile memory 204a and the volatile memory 206a via the CPU bus 202a, a memory bus controller 212a, and memory bus 205a.

The logic circuit 203a may be realized by a logic circuit (the authentication-target chip 103) or by a processor such as a CPU. The logic circuit 203a has an interface circuit 208a, a random number generator 209a, an encryptor/decryptor 210a, a deriver 211a, the memory bus controller 212a, a register 213a, and an initialization circuit 214a. The interface circuit 208a is a communication circuit that communicates with external devices via the external interface 207a. The external interface 207a is connected to the communication circuit 104. The random number generator 209a is a circuit that generates random numbers. The encryptor/decryptor 210a has an encryption circuit (an encoder) that encrypts plaintext with a key, and a decryption circuit (a decoder) that decrypts ciphertext with a key. The deriver 211a is a circuit that derives an authentication key. The memory bus controller 212a mediates or controls access to the non-volatile memory 204a and the volatile memory 206a. The register 213a is a storage device that temporarily holds information. The initialization circuit 214a is a circuit that protects the information held by the register 213a or erases the information held in the register 213a. The initialization circuit 214a may be called a "protection circuit".

The non-volatile memory 204a may be a charge storage device on a floating gate, such as electrically erasable programmable read-only memory (EEPROM) and flash memory. The non-volatile memory 204a may be Error Correcting Code (ECC) memory. ECC is a function that detects and corrects data corruption. This likely improves the reliability of the information stored in the non-volatile memory 204a, as well as memory security. The non-volatile memory 204a stores a chip ID 215a, a reception ID 216a, a pointer 217a, and a counter 218a. In addition, the non-volatile memory 204a stores an A-chip secret key 219a, an A-encrypted original key 220a, a B-chip secret key 221a, a B-encrypted original key 222a, an authentication key 223a, and program code 224a.

The chip ID 215a is identification information of the authentication-target chip 103, and is unique identification information. The reception ID 216a is identification information of the authenticating chip 106, which is received from the authenticating chip 106 and stored. The pointer 217a is used to switch between a plurality of information sets, which will be described later. The counter 218a is used to detect the authentication processing ending abnormally (unauthorized termination). The A-chip secret key 219a is a secret key associated with the A-encrypted original key 220a, and is used to reproduce the original key from the A-encrypted original key 220a. The B-chip secret key 221a is a secret key associated with the B-encrypted original key 222a, and is used to reproduce the original key from the B-encrypted original key 222a. The A-chip secret key 219a and the A-encrypted original key 220a form a single key set. The B-chip secret key 221a and the B-encrypted original key 222a form another single key set. The authentication key 223a is a key used in the authentication processing. The program code 224a is a program executed by the CPU 201a.

The CPU 201a executes the program code 224a to implement various authentication functions. The memory bus 205a and the CPU bus 202a are interposed between the CPU 201a and the program code 224a. Therefore, the readout of the program code 224a by the CPU 201a is mediated by the memory bus controller 212a. Temporary data generated during the execution of the program code 224a is stored in the volatile memory 206a. The volatile memory 206a may be Static Random Access Memory (SRAM). The memory bus controller 212a allows the CPU 201a to read and write from and to the volatile memory 206a.

The memory bus controller 212a allows the CPU 201a to read and write the chip ID 215a, the reception ID 216a, the pointer 217a, the counter 218a, and the authentication key 223a. However, the memory bus controller 212a prohibits the CPU 201a from directly reading and writing the A-chip secret key 219a, the A-encrypted original key 220a, the B-chip secret key 221a, and the B-encrypted original key 222a.

The interface circuit 208a is electrically connected to the communication circuit 104 when the process cartridge 102 is mounted to the main body of the image forming device 100. The interface circuit 208a receives a command and a challenge transmitted from the control device 105 via the communication circuit 104 and transfers those items to the CPU 201a. The CPU 201a generates a response corresponding to the command and the challenge in accordance with the program code 224a and outputs the response to the interface circuit 208a. The interface circuit 208a transmits the response to the control device 105 via the external interface 207a and the communication circuit 104.

As illustrated in FIG. 4, the configuration of the authenticating chip 106 is the same as the configuration of the authentication-target chip 103, which is illustrated in FIG. 3. The descriptions of the configuration of the authenticating chip 106 will therefore be supported by the descriptions of the configuration of the authentication-target chip 103. In other words, by replacing the letter "a" at the end of the reference signs in the foregoing descriptions with "b", the foregoing descriptions serve as descriptions of the configuration of the authentication-target chip 103. The following will focus mainly on the parts of the configuration of the authenticating chip 106 that differ from the configuration of the authentication-target chip 103.

In FIG. 4, an external interface 207b is connected to the control device 105. An interface circuit 208b communicates with the control device 105 via the external interface 207b. Program code 224b is a program that enables the CPU 201b to execute authentication processing specific to the authenticating chip 106. A chip ID 215b is identification information of the authenticating chip 106, and is unique identification information. A reception ID 216b is identification information of the authentication-target chip 103, which is received from the authentication-target chip 103 and stored.

The control device 105 transfers response data received from the authentication-target chip 103 to the authenticating chip 106 via the external interface 207b. The CPU 201b of the authenticating chip 106 receives the response data and verifies the response data (authentication processing) according to the program code 224b. In other words, the CPU 201b determines whether or not the received response data is genuine response data. The CPU 201b reports (transmits) a determination result (an authentication result) to the control device 105 via the interface circuit 208b and the external interface 207b.

Authentication Sequence

Figure 5:
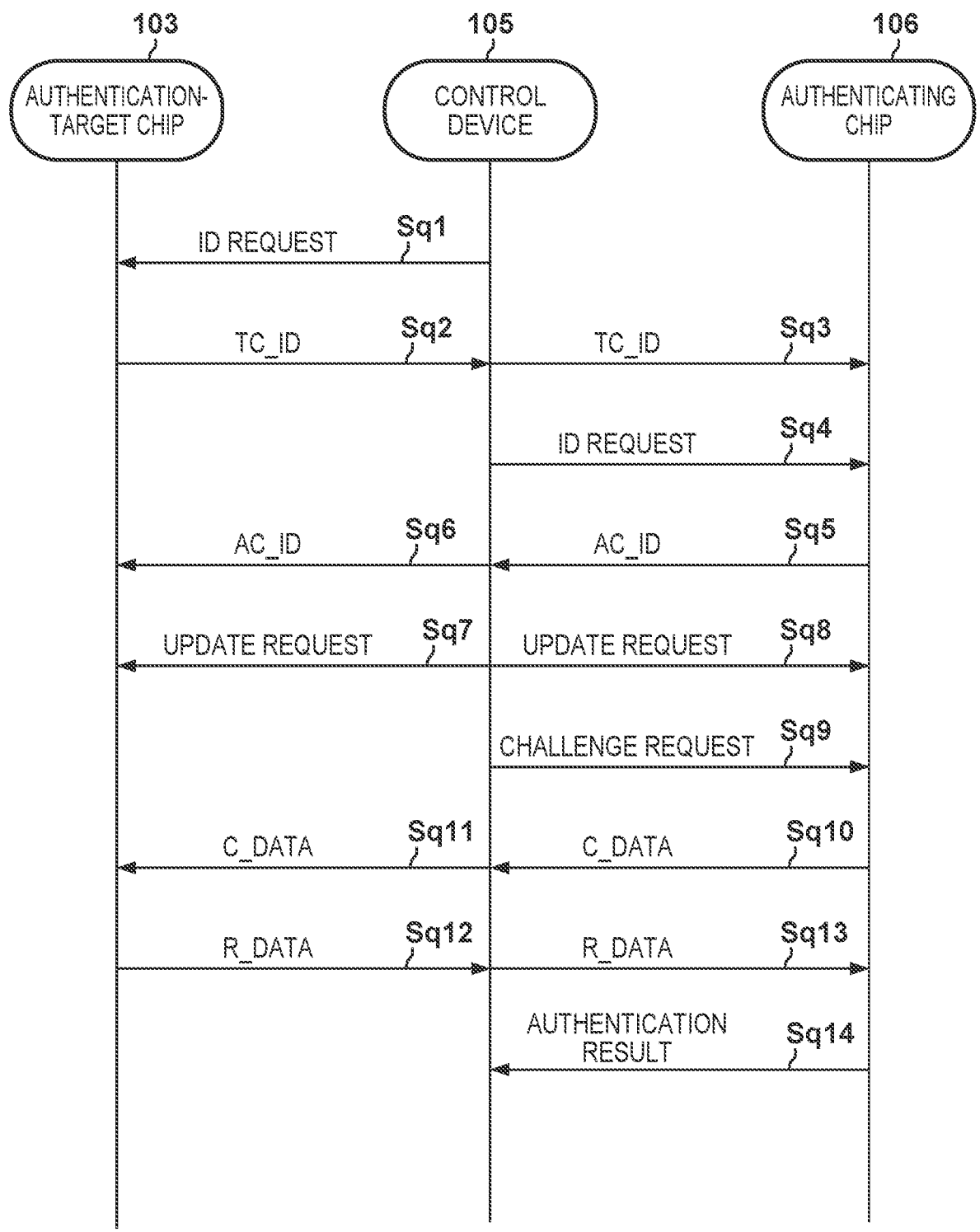
FIG. 5 is a sequence chart illustrating an authentication method.

FIG. 5 illustrates an authentication sequence executed between the authentication-target chip 103 and the authenticating chip 106. Here, the starting point of the authentication sequence is the control device 105.

Obtaining identification information of authentication-target chip 103

In Sq1, the control device 105 transmits an ID request to the authentication-target chip 103. The ID request is a command for requesting the unique identification information (the chip ID 215a) held by the authentication-target chip 103. The interface circuit 208a of the authentication-target chip 103 receives the ID request via the external interface 207a. The CPU 201a obtains the ID request from the interface circuit 208a according to the program code 224a. By comparing the ID assigned to the ID request with its own ID, the CPU 201a ascertains that the ID request is a command addressed to the authentication-target chip 103. The CPU 201a reads out "TC_ID", which is the chip ID 215a, from the non-volatile memory 204a in accordance with the ID request. As an example, TC_ID is assumed to be an 8-byte piece of information.

In Sq2, the CPU 201a of the authentication-target chip 103 transmits the TC_ID via the interface circuit 208a and the external interface 207a. The control device 105 receives the TC_ID via the communication circuit 104.

In Sq3, the control device 105 transfers "TC_ID", which is the chip ID 215a of the authentication-target chip 103, to the authenticating chip 106. The interface circuit 208b of the authenticating chip 106 receives the TC_ID via the external interface 207b. The CPU 201b obtains the TC_ID from the interface circuit 208b according to the program code 224b and recognizes that the TC_ID of the authentication-target chip 103 has been received. The CPU 201b reads out the reception ID 216b from non-volatile memory 204b. The reception ID 216b is a chip ID "TC_ID'" received in the past. The CPU 201b compares the old chip ID "TC_ID'" received in the past with the TC_ID received this time. If the two are different, the CPU 201b updates the reception ID 216b by overwriting the ID with the TC_ID received this time. If the two match, the CPU 201b discards the TC_ID received this time. The CPU 201b may store information indicating whether or not the reception ID 216b has been updated in volatile memory 206b.

Obtaining identification information of authenticating chip 106

In Sq4, the control device 105 transmits an ID request to the authenticating chip 106. The ID request is a command for requesting the unique identification information (the chip ID 215b) held by the authenticating chip 106. The interface circuit 208b of the authenticating chip 106 receives the ID request via the external interface 207b. The CPU 201b obtains the ID request from the interface circuit 208b according to the program code 224b. By comparing the ID assigned to the ID request with its own ID, the CPU 201b ascertains that the ID request is a command addressed to the authenticating chip 106. The CPU 201b reads out "AC_ID", which is the chip ID 215b, from the non-volatile memory 204b in accordance with the ID request. As an example, AC_ID is assumed to be an 8-byte piece of information.

In Sq5, the CPU 201b of the authenticating chip 106 transmits the AC_ID via the interface circuit 208b and the external interface 207b. The control device 105 receives the AC_ID from the authenticating chip 106.

In Sq6, the control device 105 transfers "AC_ID", which is the chip ID 215b of the authenticating chip 106, to the authentication-target chip 103. The interface circuit 208a of the authentication-target chip 103 receives the AC_ID via the external interface 207a. The CPU 201a obtains the AC_ID from the interface circuit 208a according to the program code 224a and recognizes that the AC_ID of the authenticating chip 106 has been received. The CPU 201a reads the reception ID 216a from the non-volatile memory 204a. The reception ID 216a is a chip ID "AC_ID'" that was received in the past. The CPU 201a compares the old chip ID "AC_ID'" received in the past with the AC_ID received this time. If the two are different, the CPU 201a updates the reception ID 216a by overwriting the ID with the AC_ID received this time. If the two match, the CPU 201a discards the AC_ID received this time. The CPU 201a may store information indicating whether or not the reception ID 216a has been updated in the volatile memory 206a.

Authentication Update

In Sq7, the control device 105 transmits an update request to the authentication-target chip 103 requesting the authentication-target chip 103 to update the authentication key 223a. Here, the authentication key is a key used for challenge-response authentication between the authenticating chip 106 and the authentication-target chip 103. The CPU 201a of the authentication-target chip 103 starts the update processing upon receiving the update request. The CPU 201a reads out information indicating whether or not the reception ID 216a has been updated from the volatile memory 206a and determines whether or not it is necessary to update the authentication key 223a. If the reception ID 216a has been updated, it is necessary to update the authentication key 223a. If the reception ID 216a has not been updated, it is not necessary to update the authentication key 223a. If it is necessary to update the authentication key 223a, the CPU 201a controls the logic circuit 203a to derive a new authentication key and overwrite the authentication key 223a therewith.

In Sq8, the control device 105 transmits an update request to the authenticating chip 106 requesting the authenticating chip 106 to update an authentication key 223b. The CPU 201b of the authenticating chip 106 starts the update processing upon receiving the update request. The CPU 201b reads out information indicating whether or not the reception ID 216b has been updated from the volatile memory 206b and determines whether or not it is necessary to update the authentication key 223b. If the reception ID 216b has been updated, it is necessary to update the authentication key 223b. If the reception ID 216b has not been updated, it is not necessary to update the authentication key 223b. If it is necessary to update the authentication key 223b, the CPU 201b controls a logic circuit 203b to derive a new authentication key and overwrite the authentication key 223b therewith.

Challenge-Response Authentication

In Sq9, the control device 105 transmits a challenge request to the authenticating chip 106. The challenge request is a command that requests the generation of challenge data C_DATA. Upon receiving the challenge request, the CPU 201b of the authenticating chip 106 controls the logic circuit 203b according to the program code 224b to generate the challenge data C_DATA.

In Sq10, the CPU 201b of the authenticating chip 106 transmits the challenge data C_DATA to the control device 105. The control device 105 receives the challenge data C_DATA from the authenticating chip 106.

In Sq11, the control device 105 transmits the challenge data C_DATA received from the authenticating chip 106 to the authentication-target chip 103. The CPU 201a of the authentication-target chip 103 receives the challenge data C_DATA from the control device 105. The CPU 201a controls the logic circuit 203a to generate response data R_DATA using the challenge data C_DATA and the authentication key 223a.

In Sq12, the CPU 201a of the authentication-target chip 103 transmits the response data R_DATA to the control device 105. The control device 105 receives the response data R_DATA from the authentication-target chip 103.

In Sq13, the control device 105 transmits the response data R_DATA received from the authentication-target chip 103 to the authenticating chip 106. The authenticating chip 106 receives the response data R_DATA from the control device 105. The authenticating chip 106 generates the response data R_DATA for verification based on the challenge data C_DATA and the authentication key 223b. The authenticating chip 106 generates an authentication result based on the received response data R_DATA and the response data R_DATA for verification.

In Sq14, the authenticating chip 106 transmits the authentication result to the control device 105. The control device 105 allows or prohibits operations of the process cartridge 102 according to the authentication result. For example, if the authentication result is "successful", the process cartridge 102 is allowed to operate. If the authentication result is "failed", the operation of the process cartridge 102 is temporarily stopped or prohibited. A display operation unit (not shown) installed in the image forming device 100 may output a warning indicating that the authentication has failed and prompt the user to decide whether or not to resume. When an indication of intent to resume is received from the display operation unit, the image forming device 100 allows or resumes operations of the process cartridge 102.

Details of Derivation of Authentication Key

Figure 6:
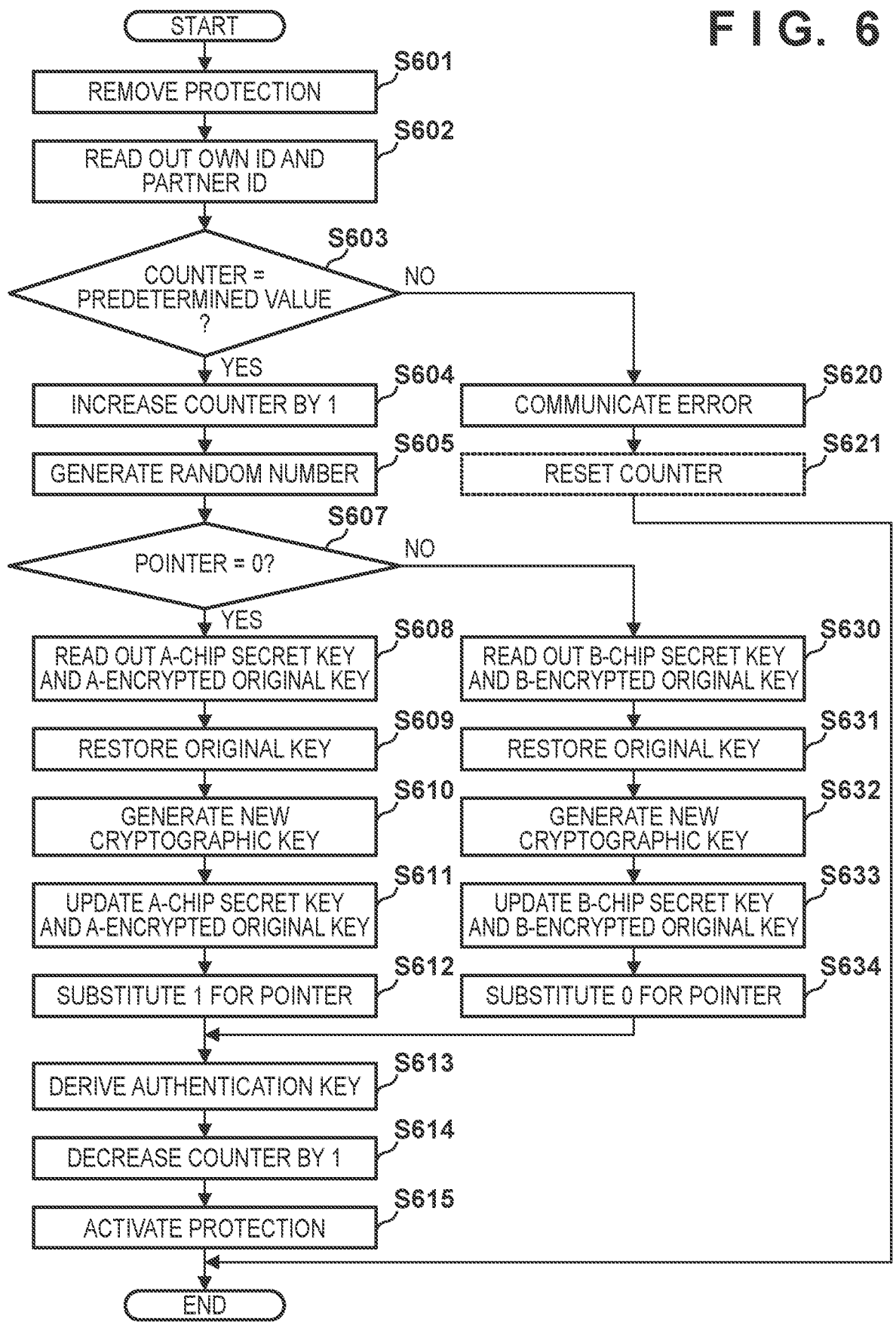
FIG. 6 is a flowchart illustrating a method of deriving an authentication key.

FIG. 6 illustrates a method of deriving the authentication key, executed by the authentication-target chip 103 and the authenticating chip 106. The method of deriving the authentication key is a process executed in common in the authentication-target chip 103 and the authenticating chip 106, "a" and "b" will be omitted from the reference signs in the following descriptions. Each step is executed by the CPU 201 according to the program code 224. Each step may also be executed by the logic circuit 203 controlled by the CPU 201.

In step S601, the CPU 201 instructs the initialization circuit 214 to remove (inactivate) protection. The initialization circuit 214 switches reading/writing from and to the register 213 from a prohibited state (a protected state) to an allowed state (a removed state) in response to the instruction from the CPU 201. Furthermore, this instruction causes the encryptor/decryptor 210 and the deriver 211 to transition from an inactive state to an active state.

In step S602, the CPU 201 reads its own ID (the chip ID 215) and the partner ID (the reception ID 216) from the non-volatile memory 204. The two IDs read out (TC_ID and AC_ID) are temporarily stored in the volatile memory 206.

In step S603, the CPU 201 reads out the counter 218 from the non-volatile memory 204 and determines whether the counter 218 is a predetermined value. As will be described below, the predetermined value is a value that indicates whether the previous authentication processing terminated abnormally. The predetermined value may be, for example, a maximum value MAXCNT that the counter 218 can take on (=3). In this case, if the value of the counter 218 is less than or equal to MAXCNT, the CPU 201 moves to step S604. The counter 218 in an initial state is 0. If the previous authentication processing has been successful (the counter 218=0), the CPU 201 moves to step S604. If the counter 218 exceeds MAXCNT, the CPU 201 moves to step S620. In step S620, the CPU 201 communicates (reports) an error to the control device 105 via the interface circuit 208. For example, the CPU 201 stops the authentication processing in the logic circuit 203 and transmits information indicating an authentication error to the control device 105. Optionally, in step S621, the CPU 201 may reset the counter 218.

In step S604, the CPU 201 increments the read-out counter 218 by 1.

In step S605, the CPU 201 generates a random number RND by instructing the random number generator 209 to generate the random number. The generated random number RND is temporarily held in the register 213 by the memory bus controller 212. Here, the random number RND is assumed to be a 16-byte piece of information.

In step S606, the CPU 201 reads out the pointer 217 and determines whether the pointer 217 is 0. The initial value of the pointer 217 is assumed to be 0. If the pointer 217 is 0, the CPU 201 executes steps S608 to S612 and steps S613 to S615. If the pointer 217 is 1, the CPU 201 executes steps S630 to S634 and steps S613 to S615.

In step S608, the CPU 201 instructs the memory bus controller 212 to read the A-chip secret key 219 and the A-encrypted original key 220 from the non-volatile memory 204, and reads the keys out as a result. Here, the A-chip secret key 219 is assumed to be TC_KEY_A, and the A-encrypted original key 220 is assumed to be EN_TORG_KEY_A. The memory bus controller 212 temporarily stores the A-chip secret key 219 and the A-encrypted original key 220 in the register 213.

Figure 7A:
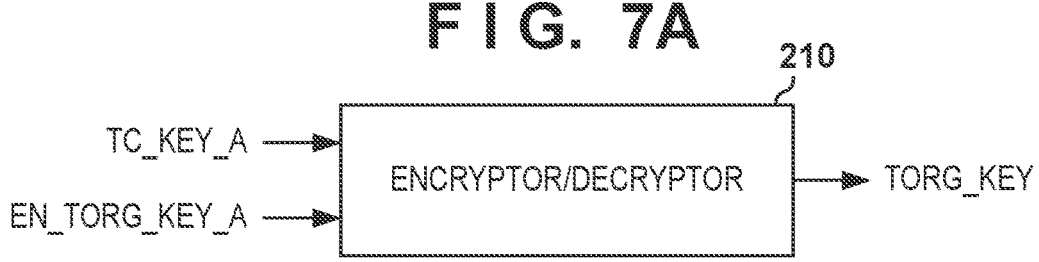
FIGS. 7A to 7E are diagrams illustrating operations of an encryptor, a decryptor, and a deriver.

In step S609, the CPU 201 reproduces an original key TORG_KEY. For example, the CPU 201 instructs the encryptor/decryptor 210 to reproduce the original key. As a result, the encryptor/decryptor 210 decrypts the A-encrypted original key 220 using the A-chip secret key 219. As illustrated in FIG. 7A, the encryptor/decryptor 210 reproduces the original key TORG_KEY from the A-chip secret key 219 "TC_KEY_A" and the A-encrypted original key 220 "EN_TORG_KEY_A". Here, the encryptor/decryptor 210 may reproduce the original key TORG_KEY according to the following formula.

$$TORG\_KEY=DEC(TC\_KEY\_A,EN\_TORG\_KEY\_A) \quad (1)$$

Here, the DEC( ) function may be a common key decryption function, such as based on the AES algorithm as described in NIST_FIPS_PUB_197, for example. TC_KEY_A is the decryption key used by the decryption function. EN_TORG_KEY_A is the input ciphertext used in the decryption function. TC_KEY_A, EN_TORG_KEY_A, and TORG_KEY are all assumed to be 16-byte pieces of information. The reproduced original key TORG_KEY is the original key used to generate the A-encrypted original key 220, and is temporarily stored in the register 213.

Figure 7B:
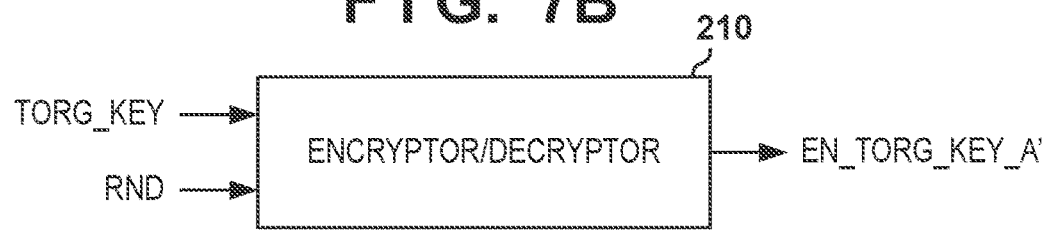

In step S610, the CPU 201 instructs the encryptor/decryptor 210 to generate a new cryptographic key, and as a result, a new cryptographic key EN_TORG_KEY_A' is generated based on the original key TORG_KEY held in the register 213 and the random number RND. As illustrated in FIG. 7B, the encryptor/decryptor 210 generates the new cryptographic key EN_TORG_KEY_A' based on the original key TORG_KEY and the random number RND. The encryptor/decryptor 210 may, for example, generate the new cryptographic key EN_TORG_KEY_A' based on the following formula.

$$EN\_TORG\_KEY\_A'=ENC(RND,TORG\_KEY) \quad (2)$$

Here, the ENC( ) function may be a common key encryption function, such as based on the AES algorithm as described in NIST_FIPS_PUB_197. ENC( ) is the inverse function of DECO. The key information to be input to ENC( ) is the random number RND. The input plaintext input to ENC( ) is the original key TORG_KEY. EN_TORG_KEY_A' is assumed to be a 16-byte piece of information. The new cryptographic key EN_TORG_KEY_A' is temporarily stored in the register 213.

In step S611, the CPU 201 updates the A-chip secret key 219 and the A-encrypted original key 220 stored in the non-volatile memory 204 by instructing the memory bus controller 212. The memory bus controller 212 overwrites the A-encrypted original key 220 with the new cryptographic key EN_TORG_KEY_A' held in the register 213. The memory bus controller 212 overwrites the A-chip secret key 219 with the random number RND stored in the register 213.

In step S612, the CPU 201 substitutes 1 for the pointer 217. As a result, the B-chip secret key 221 and the B-encrypted original key 222 are used in the next authentication processing. The CPU 201 then moves to step S613.

Figure 7C:
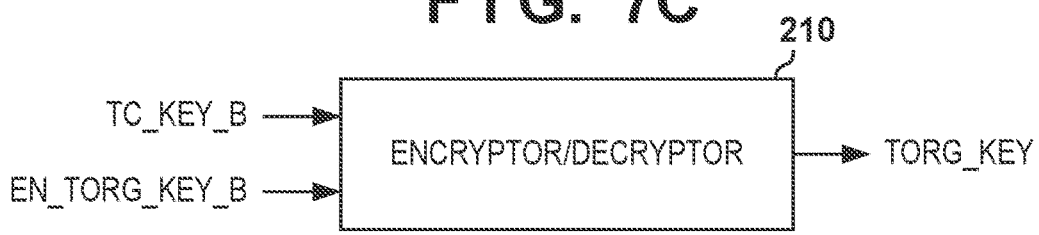

If the pointer 217 is 1, steps S630 to S634 are executed instead of steps S608 to S612. In particular, steps S630 to S633 are merely the A-chip secret key 219 replaced with the B-chip secret key 221 and the A-encrypted original key 220 replaced with the B-encrypted original key 222 in steps S608 to S611. In other words, as illustrated in FIG. 7C, the encryptor/decryptor 210 reproduces the original key TORG_KEY from the B-chip secret key 221 "TC_KEY_B" and the B-encrypted original key 222 "EN_TORG_KEY_B". Correspondingly, Formula (3) is used instead of Formula (1).

$$TORG\_KEY=DEC(TC\_KEY\_B,EN\_TORG\_KEY\_B) \quad (3)$$

Figure 7D:
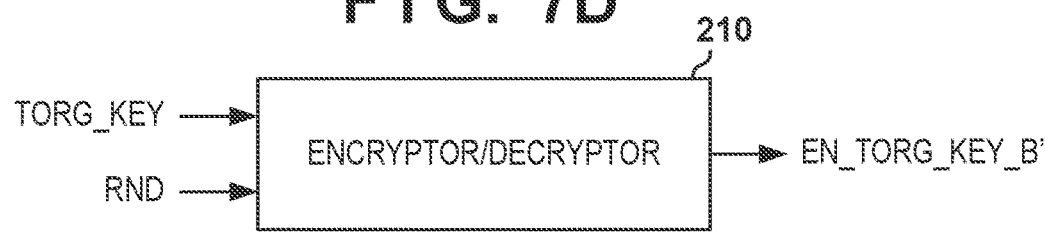

As illustrated in FIG. 7D, the encryptor/decryptor 210 generates a new cryptographic key EN_TORG_KEY_B' based on the original key TORG_KEY and the random number RND. Correspondingly, Formula (4) is used instead of Formula (2).

$$EN\_TORG\_KEY\_B'=ENC(RND,TORG\_KEY) \quad (4)$$

Here, TC_KEY_B, EN_TORG_KEY_B, and EN_TORG_KEY_B' are all 16-byte pieces of information.

In step S634, the CPU 201 substitutes 0 for the pointer 217. As a result, the A-chip secret key 219 and the A-encrypted original key 220 are used in the next authentication processing. If the pointer 217 is 0, the A set of keys is used. If the pointer 217 is 1, the B set of keys is used. In FIG. 6, the pointer 217 goes back and forth between 0 and 1, and thus the A set of keys and the B set of keys are used alternately. The CPU 201 then moves to step S613.

Figure 7E:
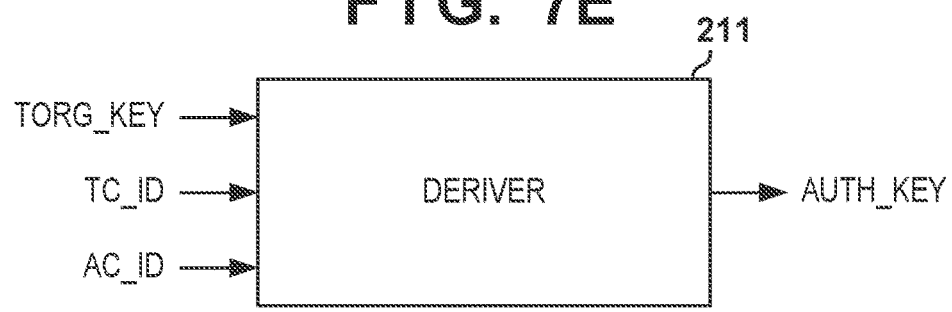

In step S613, the CPU 201 derives an authentication key AUTH_KEY by instructing the deriver 211. As illustrated in FIG. 7E, the deriver 211 derives the authentication key AUTH_KEY using the original key TORG_KEY, the TC_ID of the authentication-target chip 103, and the AC_ID of the authenticating chip 106 held in the register 213. For example, the deriver 211 may use the following formula.

$$AUTH\_KEY=SHA256(TORG\_KEY\|TC\_ID\|AC\_ID) \quad (5)$$

Here, SHA( ) is a cryptographic hash function. Details of SHA256 can be found, for example, in NIST_FIPS_PUB 180-4. A hash function is an example of a one-way function. "One-way function" is a general term for a function that generates output data from input data in such a way that the input data cannot be reproduced from the output data. The arithmetic expression ∥ denotes the concatenation of data. "TORG_KEY∥TC_ID∥AC_ID" therefore means to concatenate TORG_KEY, TC_ID, and AC_ID. As a result, 32 bytes of data are obtained. In Formula (5), 32 bytes of data are input to SHA256. SHA256 outputs 32 bytes of data. Therefore, the authentication key AUTH_KEY is the most significant (or least significant) 16 bytes of the output data that have been cut out. The CPU 201 instructs the memory bus controller 212 to overwrite the authentication key 223 in the non-volatile memory 204 with the authentication key AUTH_KEY.

In this manner, the derived authentication key 223 is stored in the non-volatile memory 204. The reason for this is to avoid re-designating the authentication key 223 to the partner once the chip ID has been exchanged. As can be seen from Formula (5), the chip ID is associated with the authentication key 223. Therefore, even if the authentication key 223 is exposed, devices provided with other chip IDs will not be able to use this authentication key 223. Accordingly, the risk of storing the authentication key 223 in the non-volatile memory 204 is small. If the exchange of chip IDs and the generation of authentication keys is repeated every time the image forming device 100 is turned on, the original key information, which is sensitive information, will be accessed. This increases the chance that the original key information will be exposed. Therefore, the authentication key 223 generated once for the same chip ID pair is stored in the non-volatile memory 204, and this authentication key 223 is used for the authentication processing. This reduces the chance that the original key information will be exposed.

In step S614, the CPU 201 decrements the counter 218 by 1. This causes the counter 218 to return from 1 to 0. In other words, the counter 218 held in the non-volatile memory 204 becomes 0.

In step S615, the CPU 201 activates the initialization circuit 214. When the initialization circuit 214 returns from the inactive state to the active state, all data held in the register 213 is erased. Additionally, the encryptor/decryptor 210 and the deriver 211 transition from an operating state to a stopped state. This completes the derivation of the authentication key.

Counter and Pointer

The counter 218 is 0 if the previous authentication processing has been ended successfully. When the authentication processing starts, the counter 218 is changed to 1, and when the authentication process ends successfully, the counter 218 is reset to 0. If the power of the authentication-target chip 103 is turned off during the authentication processing from steps S605 to S611 (a decryption update period of the authentication key), the counter 218 is kept at 1. In other words, if the update of the authentication key ends abnormally, the counter 218 remains at 1. As a result, a situation where cryptographic operations for updating the authentication key are executed repeatedly due to the power being forcibly turned off are avoided.

Because steps S607, S612, and S634 are present, the pointer 217 alternates between 0 and 1. If the pointer 217 is 0, the A set of keys is used. If the pointer 217 is 1, the B set of keys is used. By preparing a plurality of key sets in this way, for example, even if the information of the A set of keys is corrupted due to the power being forcibly turned off in the middle of an operation using the A set, the information of the B set of keys be retained normally.

Cryptographic Formulas

As mentioned above, Formulas (1) through (5) are examples. Formula (1) is a formula that derives the original key TORG_KEY by decrypting the A-encrypted original key 220 with the A-chip secret key 219. Formula (2) is a formula that generates a new A-encrypted original key 220 by encrypting the original key TORG_KEY with the random number RND. The random number RND becomes the new A-chip secret key 219. Formula (3) is a formula that derives the original key TORG_KEY by decrypting the B-encrypted original key 222 with the B-chip secret key 221. Formula (4) is a formula that generates a new B-encrypted original key 222 by encrypting the original key TORG_KEY with the random number RND. The random number RND becomes the new B-chip secret key 221. Formula (5) is a formula that derives the authentication key AUTH_KEY from the original key TORG_KEY, the identification information of the authentication-target chip 103 (TC_ID), and the identification information of the authenticating chip 106 (AC_ID).

In this manner, the original key TORG_KEY, which is the source of the authentication key AUTH_KEY, is not stored in the non-volatile memory 204. Furthermore, the original key TORG_KEY is only temporarily derived and held in the register 213 when deriving the authentication key AUTH_KEY After the derivation of the authentication key AUTH_KEY is completed, the original key TORG_KEY is deleted from the register 213.

The authentication key AUTH_KEY is associated with the identification information of the authentication-target chip 103 and the identification information of the authenticating chip 106. The authentication key AUTH_KEY is stored in the non-volatile memory 204 as the authentication key 223. However, the authentication key AUTH_KEY can only be used in combination with the identification information of the authentication-target chip 103 and the identification information of the authenticating chip 106. In other words, an authenticating apparatus or an authentication-target apparatus that has other identification information cannot use this authentication key AUTH_KEY Therefore, even if the authentication key AUTH_KEY is stored in the non-volatile memory 204, the security risk is low. Even if the authentication key AUTH_KEY is revealed for some reason, a one-way function is used in Formula (5), and thus the original key TORG_KEY will not be exposed.

Although SHA256, which is a cryptographic hash function, is used in Formula (5), this is merely an example. Other one-way functions may also be used. For example, message authentication code using a common key cryptography technique may be used. An example of a message authentication code can be found in NIST SP 800-38B. This is called "message authentication code CMAC". CMAC is an authentication algorithm designed to use the encryption function AES in message authentication. Formula (6) is a formula that derives the authentication key AUTH_KEY using CMAC. In other words, Formula (6) may be used instead of Formula (5).

$$\text{AUTH\_KEY}=\text{CMAC}(\text{TORG\_KEY},\text{TC\_ID}\|\text{AC\_ID}) \quad (6)$$

Here, the key information input to the CMAC is TORG_KEY. The input plaintext input to the CMAC is TC_ID∥AC_ID.

A more compact module may be constructed by linking the encryptor/decryptor 210 with the deriver 211a. In this case, Formula (6) is advantageous due to enabling the same cryptographic primitive function, which is AES, to be used in the encryptor/decryptor 210 and the deriver 211a. When Formula (6) is used, even if the authentication key AUTH_KEY is revealed, the original key TORG_KEY remains unknown.

In Formula (6), the CMAC operation can be executed even if the data length of TC_ID∥AC_ID exceeds 16 bytes. If the data length of C_ID∥AC_ID is less than or equal to 16 bytes, AES, a which is a primitive function of CMAC, may be used instead of CMAC.

The initialization circuit 214 controls the initialization of the register 213 and the allowance/prohibition of the operations of the encryptor/decryptor 210 and the deriver 211. Furthermore, the initialization circuit 214 may have a timer reset function. When the initialization circuit 214 removes the protection from the register 213 in step S601, the initialization circuit 214 starts its own internal timer. The initialization circuit 214 may automatically activate the protection when the timer reaches a predetermined time. As a result, the initialization circuit 214 clears the register 213 and prohibits the operations of the encryptor/decryptor 210 and the deriver 211. This makes it possible to protect the key information even if the CPU 201 falls into a runaway state.

In this manner, the authentication-target chip 103 and the authenticating chip 106 each derive the authentication key AUTH_KEY according to the same algorithm. As such, the authentication key AUTH_KEY derived by the authentication-target chip 103 and the authentication key AUTH_KEY derived by the authenticating chip 106 match. The authentication-target chip 103 and the authenticating chip 106 generate the response data R_DATA by applying the same challenge data C_DATA and the same authentication key AUTH_KEY to the same algorithm. Accordingly, the response data R_DATA of both matches, and the authentication-target chip 103 is successfully authenticated.

Method for Generating Challenge Data

Figure 8A:
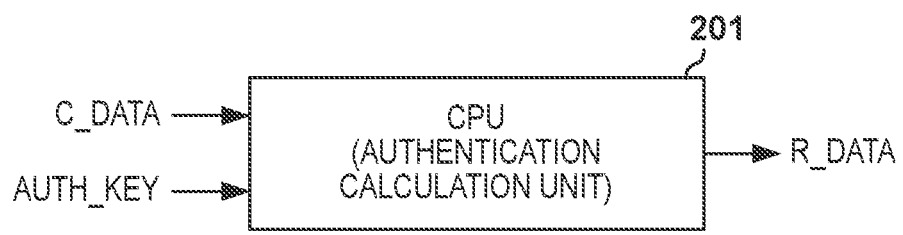
FIGS. 8A and 8B are diagrams illustrating operations of a CPU.

FIG. 8A illustrates the authentication operations executed by the CPUs 201 of the authentication-target chip 103 and the authenticating chip 106, respectively. The CPU 201 generates the response data R_DATA from the challenge data C_DATA and the authentication key AUTH_KEY Note that the CPU 201b instructs the random number generator 209b to generate the challenge data C_DATA, which is a 16-byte random number. The challenge data C_DATA is transmitted to the authentication-target chip 103 via the control device 105. Through this, the CPU 201a also shares the same challenge data C_DATA. The challenge data C_DATA is stored in the volatile memory 206.

The CPU 201 may generate the response data R_DATA according to Formula (7). Formula (7) is held in the program code 224.

$$\text{R\_DATA}=\text{SHA256}(\text{AUTH\_KEY}\|\text{C\_DATA}) \quad (7)$$

Here, SHA256( ) is the same as the cryptographic hash function described with reference to Formula (5). SHA256( ) is incorporated into the program code 224. The operation using SHA256( ) may be implemented with the assistance of the deriver 211a. Formula (8) may be used instead of Formula (7).

$$\text{R\_DATA}=\text{CMAC}(\text{AUTH\_KEY},\text{C\_DATA}) \quad (8)$$

Here, CMAC is the same as the function for message authentication described with reference to Formula (6). The authentication key AUTH_KEY is the input cryptographic key that is input to the CMAC. C_DATA is the input plaintext input to the CMAC. Both Formulas (7) and (8) are one-way functions. Accordingly, even if the response data R_DATA is revealed, the authentication key AUTH_KEY will not be derived. In Formula (8) too, the data length of C_DATA may exceed 16 bytes. If C_DATA is less than or equal to 16 bytes, the CMAC uses the primitive function, which is AES.

The response data R_DATA generated by the authentication-target chip 103 is transmitted to the authenticating chip 106. The CPU 201b of the authenticating chip 106 receives the response data R_DATA via the external interface 207b and the interface circuit 208b. The CPU 201b stores the response data R_DATA in the volatile memory 206b.

Figure 8B:
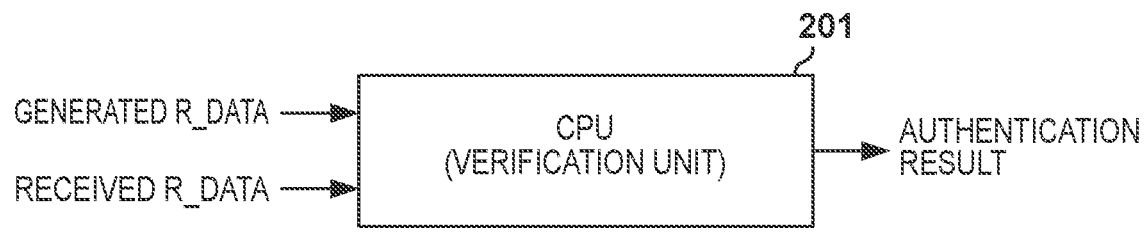

As illustrated in FIG. 8B, the CPU 201b calculates the authentication result by comparing the response data R_DATA for verification generated by the authenticating chip 106 with the response data R_DATA generated by the authentication-target chip 103 and received. In other words, the CPU 201b determines whether the response data R_DATA for verification generated by the authenticating chip 106 and the response data R_DATA generated by the authentication-target chip 103 and received match. The CPU 201b transmits the authentication result (information indicating whether the authentication is successful) to the control device 105 via the external interface 207b and the interface circuit 208b. If the authentication key AUTH_KEY held by the authenticating chip 106 and the authentication key AUTH_KEY held by the authentication-target chip 103 are the same, the original key held by the authenticating chip 106 and the original key held by the authentication-target chip 103 are also the same. The authentication is therefore successful.

The authentication-target chip 103 and the authenticating chip 106 may use any one-way function, such as SHA256( ) or CMAC( ). However, it is necessary for the function used by the authentication-target chip 103 to match the one-way function used by the authenticating chip 106. Similarly, it is necessary for the one-way functions used by the authentication-target chip 103 and the authenticating chip 106 to generate the response data R_DATA to match as well.

In the authentication method described above, the authenticating chip 106 and the authentication-target chip 103 are confirmed as holding the same original key TORG_KEY. The original key TORG_KEY itself is not present in the non-volatile memory 204. The A-chip secret key 219, the A-encrypted original key 220, the B-chip secret key 221, and the B-encrypted original key 222 are stored in the non-volatile memory 204. However, these are information generated from the original key TORG_KEY and the random number RND through cryptographic operations. Accordingly, even if this secret information is exposed in a microprobing attack, the original key TORG_KEY will not be exposed.

Advantage of Present Embodiment Against Microprobing Attack

In a microprobing attack, probing points are generally generated on the surface of a Large-Scale Integration (LSI) chip by a Focused Ion Beam (FIB) device. Specifically, the protective film on the surface of the LSI chip is partially removed to expose aluminum or copper wiring. Then, metal atoms such as tungsten are deposited on the probing points of the wires to be read by the FIB device. This is to enable the probing points on the LSI chip to be contacted from the surface of the LSI chip. The memory bus 205a is likely to be selected as the attack target. A bus is also easy to read because a plurality of storage cells are regularly provided in the volatile memory 206 and the non-volatile memory 204. A plurality of logic modules are connected to the bus, and as a result, the transistor cells become larger. The metal wiring of the bus is also broad and long. This makes it easier for the FIB device to process the bus. However, to analyze a high-performance chip such as a 32-bit CPU, it is necessary to probe and read out many nodes, such as the data bus, the address bus, the control bus, and the clock. Meanwhile, thin and pointed contact needles are used for probing. The component that holds the contact needles will be relatively large. Due to this limitation, only several probing points can be read at one time. Therefore, to analyze large-scale CPU data, it is necessary to group the probing points into predetermined numbers of points and execute measurements on a group-by-group basis.

An attacker may narrow down the attack target to the A-chip secret key 219a and the A-encrypted original key 220a. In this case, it is necessary for probing to be executed at the timing when the CPU 201a accesses those keys. Even if some of the information to be exposed is successfully exposed at this time, when the A-chip secret key 219a and the A-encrypted original key 220a are accessed at the next opportunity for probing, the A-chip secret key 219a and the A-encrypted original key 220a will already have been rewritten. Accordingly, unless the entire A-chip secret key 219a and A-encrypted original key 220a are revealed in a single measurement, the original key TORG_KEY, which is what the attacker actually wishes to know, will not be exposed. This would not result in enough of an information leak to create a copy chip.

The original key TORG_KEY is temporarily stored in the register 213a. However, the period of time for which the original key TORG_KEY is held in the register 213a is only a very short period of time for generating the authentication key AUTH_KEY. In the register 213a of the logic circuit 203a, the wiring connecting the small transistor cells can be embedded in the metal of lower layers in a short and dense manner. Therefore, when hardware-based tamper-resistant technology is installed, such as providing a shielding layer on the metal in the uppermost area, it becomes very difficult to draw all the probing points out to the chip surface. It will therefore also be difficult to expose the original key TORG_KEY from the logic circuit 203a. Additionally, the register 213a and memory bus controller 212a may be controlled to prohibit the original key, the chip secret keys, and the encrypted original keys from appearing on the CPU bus 202a. This makes it difficult to draw out the original key from the CPU bus 202a.

The authentication key AUTH_KEY is directly accessible from the CPU 201a. Hypothetically, the authentication key AUTH_KEY may be exposed by an attacker. However, the authentication key AUTH_KEY is valid only in the combination of an image forming device 100 provided with an authenticating chip 106 that stores specific identification information and a process cartridge 102 provided with an authentication-target chip 103 that stores specific identification information. In other words, the exposed authentication key AUTH_KEY cannot be used for any other combination of image forming devices 100 and process cartridges 102. As such, even if the authentication key AUTH_KEY is derived through a destructive attack such as a microprobing attack, it is difficult to create a counterfeit of the process cartridge 102. For such reasons, the authentication-target chip 103 and the authenticating chip 106 in the first embodiment are extremely resistant to microprobing attacks.

In the foregoing descriptions, the encryptor/decryptor 210 is responsible for encrypting and decrypting the keys. The encryptor/decryptor 210 may be implemented as a separate encryptor and decryptor. In this case, because the encryptor and the decryptor are inverse functions of each other, the decryption of the key may be executed by the encryptor and the encryption of the key may be performed by the decryptor. The A-encrypted original key 220 and the A-chip secret key 219 are stored as a pair in the non-volatile memory 204. The B-encrypted original key 222 and the B-chip secret key 221 are stored as a pair in the non-volatile memory 204. In the first embodiment, these two sets of keys are used alternately. The reason for the existence of two sets of keys is to ensure data integrity even in the event of the power being unintentionally turned off. Therefore, three or more key sets may be provided and used cyclically. As already described, the non-volatile memory 204 may suppress errors through ECC, but bit errors which cannot be correct may arise. Increasing the number of key sets held in the non-volatile memory 204 makes it easier to retain key sets for which errors can be corrected through ECC.

Second Embodiment

In the first embodiment, the authentication-target chip 103 and the authenticating chip 106 use common hardware and common algorithms to derive the same authentication key AUTH_KEY. In addition, the authentication-target chip 103 and the authenticating chip 106 temporarily hold the original key TORG_KEY, which is the item to be kept most secret, in the register 213. The wiring of the register 213 can be localized to the lower wiring layers of each chip. This wiring may furthermore be protected by a shielding layer disposed on top of each chip. This provides hardware-based tamper resistance. Hardware-based tamper resistance can be applied not only to the authentication-target chip 103, but also to the authenticating chip 106. The second embodiment assumes that high hardware-based tamper resistance is concentrated only on the authentication-target chip 103. The attack target is therefore essentially limited to the authentication-target chip 103.

In the second embodiment, the hardware configuration and memory configuration of the authentication-target chip 103 is the same as in the first embodiment. However, the program code 224a of the authentication-target chip 103 has been changed.

Figure 9:
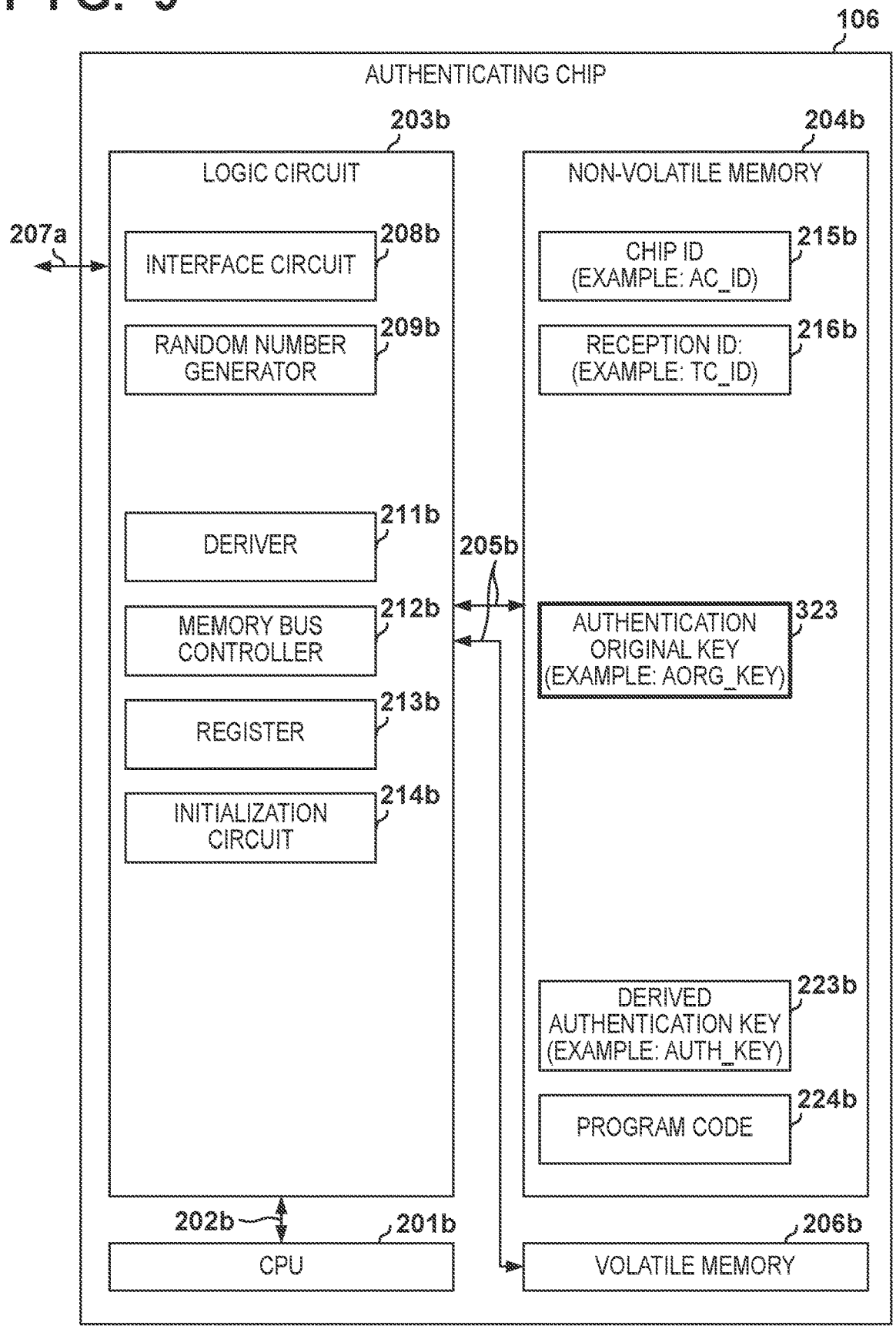
FIG. 9 is a diagram illustrating an authenticating chip.

Furthermore, in the second embodiment, the hardware configuration and memory configuration of the authenticating chip 106 have been changed. FIG. 9 illustrates the configuration of the authenticating chip 106. Compared to FIG. 4, in FIG. 9, there is no encryptor/decryptor 210b in the logic circuit 203b. Furthermore, there is no pointer 217b, counter 218b, A-chip secret key 219b, A-encrypted original key 220b, B-chip secret key 221b, or B-encrypted original key 222b in the non-volatile memory 204b. Instead, the non-volatile memory 204b stores an authentication original key 323.

Authentication Sequence

The authentication sequence in the second embodiment is the same as the authentication sequence in the first embodiment.

Method for Deriving Authentication Key (1) Derivation of Authentication Key in Authentication-Target Chip 103

The authentication-target chip 103 derives the authentication key AUTH_KEY using the following Formula (10) instead of Formula (5).

$$\text{AUTH\_KEY}=\text{SHA256}(\text{SHA256}(\text{TORG\_KEY}\|\text{AC\_ID})\|\text{TC\_ID}) \quad (10)$$

In other words, the deriver 211a uses the hash function SHA256( ) twice. First, the deriver 211a concatenates the original key TORG_KEY and the chip ID of the authenticating chip 106 to calculate concatenated information TORG_KEY∥AC_ID. Next, the deriver 211a inputs the concatenated information TORG_KEY∥AC_ID into SHA256( ) to obtain SHA256(TORG_KEY∥AC_ID), which is the calculation result. Next, the deriver 211a concatenates SHA256 (TORG_KEY∥AC_ID), which is the calculation result, with the chip ID (=TC_ID) of the authentication-target chip 103, and obtains concatenated information. The deriver 211a inputs the concatenated information (SHA256 (TORG_KEY∥AC_ID)∥TC_ID) into SHA256( ) again, and derives the authentication key AUTH_KEY Here, SHA256 is a hash function identical to that defined in Formula (5). The authentication key AUTH_KEY calculated through Formula (10) is stored in the non-volatile memory 204a as the authentication key 223a.

Instead of Formula (10), message authentication code CMAC using a common key cryptography technique may be used. In this case, Formula (10) is replaced by Formula (11).

$$\text{AUTH\_KEY}=\text{CMAC}(\text{CMAC}(\text{TORG\_KEY},\text{AC\_ID}), \text{TC\_ID}) \quad (11)$$

Here, CMAC( ) is identical to the message authentication code function described with reference to Formula (6). In Formula (11), the CMAC( ) calculation is executed twice. In the first calculation, the deriver 211a generates message authentication code of the original key TORG_KEY and AC_ID, which is the chip ID. In the second calculation, the deriver 211a uses the result of the first calculation, which is CMAC(TORG_KEY,AC_ID), as the key input. In other words, the deriver 211a generates a message authentication code of CMAC(TORG_KEY,AC_ID) and TC_ID.

(2) Derivation of Authentication Key in Authenticating Chip 106

The chip ID 215b, which is the identification information of the authenticating chip 106, and the corresponding authentication original key 323, are written in the non-volatile memory 204b of the authenticating chip 106 in advance. The authentication original key 323 may be denoted as an authentication original key AORG_KEY. The chip ID 215b of the authenticating chip 106 is AC_ID. The following relationship is established between AORG_KEY and AC_ID.

$$\text{AORG\_KEY}=\text{SHA256}(\text{TORG\_KEY}\|\text{AC\_ID}) \quad (12)$$

Here, the original key TORG_KEY is the same as the original key TORG_KEY found in the process of the authentication-target chip 103 deriving the authentication key AUTH_KEY, and is information that is handled only by the manufacturing plant of the printer in which the authenticating chip 106 is installed. In other words, the authenticating chip 106 itself does not derive the original key TORG_KEY according to the program code 224b. The SHA256( ) function is the same as that used in Formula (10).

As illustrated in FIG. 10, the deriver 211b derives the authentication key AUTH_KEY using the chip ID (=TC_ID) of the authentication-target chip 103, received via the control device 105, and the authentication original key AORG_KEY For example, the deriver 211b may use Formula (13).

$$\text{AUTH\_KEY}=\text{SHA256}(\text{AORG\_KEY}\|\text{TC\_ID}) \quad (13)$$

Here, SHA256( ) is the same as that used in Formula (10).

Through the foregoing calculation procedure, the authentication key AUTH_KEY derived by the authentication-target chip 103 according to Formula (10) and the authentication key AUTH_KEY derived by the authenticating chip 106 according to Formula (13) match. The calculations executed by the authenticating chip 106 to derive the authentication key AUTH_KEY may be executed with the assistance of the deriver 211b, or by the CPU 201b according to the program code 224b.

If the authentication-target chip 103 uses Formula (11) instead of Formula (10), the following Formula (14) holds true instead of Formula (12).

$$\text{AORG\_KEY}=\text{CMAC}(\text{TORG\_KEY},\text{AC\_ID}) \quad (14)$$

Here, CMAC( ) which is the message authentication code function, is the same as that used in Formula (11). This authentication original key AORG_KEY is written into the non-volatile memory 204b as the authentication original key 323 at the factory. In this case, the authenticating chip 106 uses Formula (15) instead of Formula (13) to derive the authentication key AUTH_KEY $$\text{AUTH\_KEY}=\text{CMAC}(\text{AORG\_KEY},\text{TC\_ID}) \quad (15)$$

Here, CMAC( ) is the same as that used in Formula (11). Through the foregoing calculation procedure, the authentication key AUTH_KEY derived by the authentication-target chip 103 according to Formula (11) and the authentication key AUTH_KEY derived by the authenticating chip 106 according to Formula (15) match.

The same hash function is used in Formulas (12) and (13), but this is merely an example. Different hash functions may be used in Formulas (12) and (13). It is sufficient to use a function for which the input value is computationally difficult to derive from the output value. Similarly, different message authentication code functions may be used in Formulas (14) and (15). AES is given as a primitive function of CMAC( ), but this is merely an example. Different common key cryptography may be used in Formulas (14) and (15). If the input plaintext length of the CMAC is less than or equal to 16 bytes, the CMAC itself may be replaced by AES, which is the primitive function.

Flowchart

FIG. 11 illustrates a method of deriving the authentication key AUTH_KEY executed by the CPU 201b of the authenticating chip 106.

In step S1101, the CPU 201b reads out the ID of the partner (the reception ID 216b) from non-volatile memory 204b. In step S1102, the CPU 201b reads out the authentication original key 323 from the non-volatile memory 204b. In step S1103, the CPU 201b calculates the authentication key AUTH_KEY based on the ID of the partner (the reception ID 216b) and the authentication original key 323 (the authentication original key AORG_KEY). As described above, the deriver 211b may calculate the authentication key AUTH_KEY.

In the second embodiment, the authentication original key 323 (=AORG_KEY) held by the authenticating chip 106 is different for each chip ID 215b (AC_ID) held by the authenticating chip 106. As mentioned above, the authenticating chip 106 provided in the printer can be subjected to destructive attacks such as microprobing attacks. As a result, the authentication original key 323 of the authenticating chip 106 may be exposed. However, the exposed information cannot be used by other printers having other chip IDs 215b. Accordingly, an attack that involves the destruction of the printer containing the authenticating chip 106 is substantially worthless.

In the first embodiment, it is necessary for the logic circuit 203 to be tamper-resistant in both the authentication-target chip 103 and the authenticating chip 106. On the other hand, in the second embodiment, it is not necessary for the authenticating chip 106 to be tamper-resistant. It is therefore sufficient to concentrate on protecting the authentication-target chip 103. This contributes to a reduction in the production cost of the overall authentication system.

Technical Spirit Derived from Embodiments

Aspects 1 and 24

The image forming device 100 is an example of an authentication system for authenticating an authentication-target apparatus (example: the authentication-target chip 103) by transmitting challenge data from an authenticating apparatus (example: the authenticating chip 106) to the authentication-target apparatus and transmitting response data from the authentication-target apparatus to the authenticating apparatus. The authentication-target apparatus may include the following units. The non-volatile memory 204a is an example of a non-volatile first storage unit that stores a secret key of the authentication-target apparatus (example: the A-chip secret key 219a) and an encrypted original key generated by encrypting an original key using the secret key (example: the A-encrypted original key 220a). The encryptor/decryptor 210a is an example of a first decryption unit that reproduces the original key by decrypting the encrypted original key using the secret key stored in the first storage unit. The register 213a is an example of a volatile first holding unit that temporarily holds the original key (example: TORG_KEY). The random number generator 209a is an example of a first random number generation unit that generates a random number. The encryptor/decryptor 210a is an example of a first encryption unit that generates a new encrypted original key by encrypting the original key using the random number as a new secret key. The CPU 201a and the memory bus controller 212a are an example of a first updating unit that updates the secret key and the encrypted original key stored in the first storage unit using the new secret key and the new encrypted original key. The deriver 211a is an example of a first deriving unit that derives an authentication key based on the original key held in the first holding unit. The CPU 201a is an example of a first generation unit that generates the response data based on the challenge data received from the authenticating apparatus and the authentication key.

The authenticating apparatus may include the following units. The non-volatile memory 204b is an example of a non-volatile second storage unit that stores a secret key of the authenticating apparatus and an encrypted original key generated by encrypting an original key using the secret key. The encryptor/decryptor 210b is an example of a second decryption unit that reproduces the original key by decrypting the encrypted original key using the secret key stored in the second storage unit. The register 213b is an example of a volatile second holding unit that temporarily holds the original key. The random number generator 209b is an example of a second random number generation unit that generates a random number. The encryptor/decryptor 210b is an example of a second encryption unit that generates a new encrypted original key by encrypting the original key using the random number as a new secret key. The CPU 201b and the memory bus controller 212b are an example of a second updating unit that updates the secret key and the encrypted original key stored in the second storage unit using the new secret key and the new encrypted original key. The deriver 211b is an example of a second deriving unit that derives an authentication key based on the original key held in the second holding unit. The CPU 201b is an example of a second generation unit that generates response data for verification based on the challenge data and the authentication key. The CPU 201b is an example of an authentication unit that obtains an authentication result based on the response data transmitted from the authentication-target apparatus and the response data for verification. In this manner, the original key itself is not stored in the non-volatile memory 204, and is instead only temporarily held in the volatile memory (the register 213) during the process of authentication, which makes it more difficult than before to counterfeit the authentication-target apparatus.

Aspect 2

The initialization circuit 214a is an example of a first deleting unit that deletes the original key held in the first holding unit when the first deriving unit derives the authentication key. Through this, the period for which the original key is held is shortened.

Aspect 3

The initialization circuit 214a is an example of a protecting unit that protects the original key held in the first holding unit until the deriving of the authentication key by the first deriving unit is complete. Through this, the original key is protected at least until the derivation of the authentication key is complete, and thus the authentication key is derived accurately.

Aspect 4

As described with reference to step S603, the CPU 201a may function as a first monitoring unit that monitors whether or not the deriving of the authentication key by the first deriving unit has ended abnormally. Reproduction of the original key by the second decryption unit is prohibited when the first monitoring unit detects that the deriving of the authentication key by the first deriving unit has ended abnormally. This prevents the original key from being exposed.

Aspect 5

The counter 218a is an example of a counter that is set to a predetermined value when the deriving of the authentication key by the first deriving unit is started and is set to a value different from the predetermined value when the deriving of the authentication key by the first deriving unit ends normally. The CPU 201a may detect whether the deriving of the authentication key by the first deriving unit has ended abnormally based on the counter.

Aspect 6

As described with reference to step S620, the interface circuit 208a may function as a first reporting unit that reports that the deriving of the authentication key by the first deriving unit has ended abnormally.

Aspects 7-9

As illustrated in FIG. 3, the first storage unit may store at least two key sets, each key set being a set of a different secret key and a different encrypted original key. As illustrated in FIG. 6, of the at least two key sets, the first decryption unit (example: the encryptor/decryptor 210a) does not use a same key set successively to reproduce the original key. By preparing a plurality of key sets in this manner, even if one key set is destroyed, the authentication processing will succeed using the remaining key set. The first decryption unit (example: the encryptor/decryptor 210a) may alternatingly use a first key set and a second key set, included in the at least two key sets, as the key set to reproduce the original key. A first designating unit (example: the pointer 217a) that, of the at least two key sets, designates a key set to be used by the first decryption unit to reproduce the original key may further be provided.

Aspects 10-12

As described with reference to Formulas (7) and (8), the first generation unit (example: the CPU 201a) may generate the response data by inputting the authentication key and the challenge data to a one-way function. Through this, even if the response data is exposed, the authentication key will not be exposed. As described with reference to Formula (7), the first generation unit (example: the CPU 201a) may concatenate, and then input to the one-way function, the authentication key and the challenge data. As described with reference to Formula (8), the first generation unit (example: the CPU 201a) may input the authentication key to the one-way function as a key parameter, and input the challenge data to the one-way function as plaintext.

Aspects 13-16

As described with reference to Formulas (5) and (6), the first deriving unit (example: the deriver 211a) may derive the authentication key based on the original key held in the first holding unit, identification information of the authenticating apparatus received from the authenticating apparatus, and identification information of the authentication-target apparatus. For example, the first deriving unit (the deriver 211a) may input, to a one-way function, the original key held in the first holding unit, identification information of the authenticating apparatus received from the authenticating apparatus, and identification information of the authentication-target apparatus. As described with reference to Formula (5), the first deriving unit (example: the deriver 211a) may concatenate, and then input to the one-way function, the original key held in the first holding unit, the identification information of the authenticating apparatus received from the authenticating apparatus, and the identification information of the authentication-target apparatus. As described with reference to Formula (6), the first deriving unit (example: the deriver 211a) may input the original key held in the first holding unit to the one-way function as a key parameter. Furthermore, the first deriving unit (example: the deriver 211a) may input, to the one-way function, plaintext generated by concatenating the identification information of the authenticating apparatus received from the authenticating apparatus and the identification information of the authentication-target apparatus.

Aspects 17 and 25

As illustrated in FIG. 5, an authentication system is provided for authenticating an authentication-target apparatus by transmitting challenge data from an authenticating apparatus to the authentication-target apparatus and transmitting response data from the authentication-target apparatus to the authenticating apparatus. The authentication-target apparatus may include the units described in Aspect 1. As described in the second embodiment, the authenticating apparatus includes the following units. The non-volatile memory 204b is an example of a non-volatile second storage unit that stores the authentication original key AORG_KEY serving as a source for deriving the authentication key. As illustrated in FIG. 10, the deriver 211b functions as a second deriving unit that derives the authentication key based on identification information of the authentication-target apparatus and the authentication original key stored in the second storage unit. As illustrated in FIG. 8A, the CPU 201b functions as a second generation unit that generates response data for verification based on the challenge data and the authentication key. As illustrated in FIG. 8B, the CPU 201b functions as an authentication unit that obtains an authentication result based on the response data transmitted from the authentication-target apparatus and the response data for verification.

Aspects 18-22

As described with reference to Formulas (10) and (11), the first deriving unit (example: the deriver 211b) may derive the authentication key based on the original key held in the first holding unit, identification information of the authenticating apparatus received from the authenticating apparatus, and identification information of the authentication-target apparatus. As indicated by Formula (10), the first deriving unit may generate key data equivalent to the authentication original key by concatenating, and then inputting to a first one-way function, the original key held in the first holding unit and the identification information of the authenticating apparatus received from the authenticating apparatus. Furthermore, the first deriving unit may derive the authentication key based on the key data and the identification information of the authentication-target apparatus. As indicated by Formula (10), the first deriving unit may derive the authentication key by concatenating, and then inputting to a second one-way function, the key data and the identification information of the authentication-target apparatus. As indicated by Formula (11), the first deriving unit may generate key data equivalent to the authentication original key by inputting, to a first one-way function, the original key held in the first holding unit as a key parameter and the identification information of the authenticating apparatus received from the authenticating apparatus as plaintext. Furthermore, the first deriving unit may derive the authentication key based on the key data and the identification information of the authentication-target apparatus. As indicated by Formula (11), the first deriving unit may derive the authentication key by inputting, to a second one-way function, the key data as a key parameter and the identification information of the authentication-target apparatus as plaintext.

Aspect 23

The authenticating apparatus may be an image forming device, and the authentication-target apparatus may be a replaceable component or a consumable that can be attached to and removed from the image forming device. Through this, counterfeiting of the replaceable component or the consumable will be suppressed, and the number of malfunctions of the image forming device caused by counterfeits will be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081200, filed May 12, 2021 which is hereby incorporated by reference herein in its entirety.

What is claimed is:

1. An authentication system for authenticating an authentication-target apparatus by transmitting challenge data from an authenticating apparatus to the authentication-target apparatus and transmitting response data from the authentication-target apparatus to the authenticating apparatus, wherein the authentication-target apparatus comprises:

a first non-volatile memory that stores a secret key of the authentication-target apparatus and an encrypted original key generated by encrypting an original key using the secret key;

a first decryptor that reproduces the original key, which was used to generate the encrypted original key, by decrypting the encrypted original key using the secret key stored in the first non-volatile memory;

a first volatile memory that temporarily holds the reproduced original key obtained by the first decryptor;

a first random number generator that generates a random number;

a first encryptor that generates a new encrypted original key by obtaining a copy of the reproduced original key held by the first volatile memory and encrypting the copy of the reproduced original key obtained from the first volatile memory using the random number as a new secret key; and a first processor configured to update the secret key and the encrypted original key stored in the first non-volatile memory using the new secret key and the new encrypted original key, derive an authentication key based on the reproduced original key held in the first volatile memory, identification information of the authenticating apparatus, and identification information of the authentication-target apparatus, and generate the response data based on the challenge data received from the authenticating apparatus and the authentication key derived by the first processor, and the authenticating apparatus comprises:

a second non-volatile memory that stores a secret key of the authenticating apparatus and an encrypted original key generated by encrypting an original key using the secret key;

a second decryptor that reproduces the original key, which was used to generate the encrypted original key stored in the second non-volatile memory, by decrypting the encrypted original key using the secret key stored in the second non-volatile memory;

a second volatile memory that temporarily holds the reproduced original key obtained by the second decryptor;

a second random number generator that generates a random number;

a second encryptor that generates a new encrypted original key by obtaining a copy of the reproduced original key held by the second volatile memory and encrypting the copy of the reproduced original key obtained from the second volatile memory using the random number generated by the second random number generator as a new secret key; and a second processor that updates the secret key and the encrypted original key stored in the second non-volatile memory using the new secret key and the new encrypted original key, derives an authentication key based on the reproduced original key held in the second volatile memory, identification information of the authenticating apparatus, and identification information of the authentication-target apparatus, generates response data for verification based on the challenge data and the authentication key derived by the second processor, and obtains an authentication result based on the response data transmitted from the authentication-target apparatus and the response data for verification, wherein the authentication-target apparatus deletes the reproduced original key held in the first volatile memory when the authentication key is derived by the first processor, wherein the authenticating apparatus is an image forming device, and the authentication-target apparatus is a replaceable component or a consumable that can be attached to and removed from the image forming device, and wherein the replaceable component or the consumable is allowed to operate in response to the obtained authentication result being successful.

2. The authentication system according to claim 1, wherein the authentication-target apparatus protects the reproduced original key held in the first volatile memory until the deriving of the authentication key by the first processor is complete.

3. The authentication system according to claim 1, wherein the first processor is configured to monitor and detect whether the deriving of the authentication key by the first processor has ended abnormally, and reproduction of the original key by the second decryptor is prohibited when the first processor detects that the deriving of the authentication key has ended abnormally.

4. The authentication system according to claim 3, wherein the first processor includes a counter that is set to a predetermined value when the deriving of the authentication key by the first processor is started and is set to a value different from the predetermined value when the deriving of the authentication key by the first processor ends normally, and detects whether the deriving of the authentication key by the first processor has ended abnormally based on the counter.

5. The authentication system according to claim 4, wherein the first processor is configured to report that the deriving of the authentication key by the first processor has ended abnormally.

6. The authentication system according to claim 1, wherein the first non-volatile memory stores at least two key sets, each key set being a set of a different secret key and a different encrypted original key, and of the at least two key sets, the first decryptor does not use a same key set successively to reproduce the original key.

7. The authentication system according to claim 6, wherein the first decryptor alternatingly uses a first key set and a second key set, included in the at least two key sets, as the key set to reproduce the original key.

8. The authentication system according to claim 7, wherein of the at least two key sets, the first processor designates a key set to be used by the first decryptor to reproduce the original key.

9. The authentication system according to claim 1, wherein the first processor generates the response data by inputting the authentication key and the challenge data to a one-way function.

10. The authentication system according to claim 9, wherein the first processor concatenates, and then inputs to the one-way function, the authentication key and the challenge data.

11. The authentication system according to claim 10, wherein the first processor derives the authentication key by inputting, to a one-way function, the reproduced original key held in the first volatile memory, the identification information of the authenticating apparatus received from the authenticating apparatus, and the identification information of the authentication-target apparatus.

12. The authentication system according to claim 11, wherein the first processor concatenates, and then inputs to the one-way function, the reproduced original key held in the first volatile memory, the identification information of the authenticating apparatus received from the authenticating apparatus, and the identification information of the authentication-target apparatus.

13. The authentication system according to claim 11, wherein the first processor inputs the reproduced original key held in the first volatile memory to the one-way function as a key parameter, and inputs, to the one-way function, plaintext generated by concatenating the identification information of the authenticating apparatus received from the authenticating apparatus and the identification information of the authentication-target apparatus.

14. The authentication system according to claim 9, wherein the first processor inputs the authentication key to the one-way function as a key parameter, and inputs the challenge data to the one-way function as plaintext.

15. An authentication system for authenticating an authentication-target apparatus by transmitting challenge data from an authenticating apparatus to the authentication-target apparatus and transmitting response data from the authentication-target apparatus to the authenticating apparatus, wherein the authentication-target apparatus comprises:

a first non-volatile memory that stores a secret key of the authentication-target apparatus and an encrypted original key generated by encrypting an original key using the secret key;

a first decryptor that reproduces the original key, which was used to generate the encrypted original key, from the secret key and the encrypted original key stored in the first non-volatile memory;

a first volatile memory that temporarily holds the reproduced original key obtained by the first decryptor;

a first random number generator that generates a random number;

a first encryptor that generates a new encrypted original key by obtaining a copy of the reproduced original key held by the first volatile memory and encrypting the copy of the reproduced original key obtained from the first volatile memory using the random number as a new secret key; and a first processor that updates the secret key and the encrypted original key stored in the first non-volatile memory using the new secret key and the new encrypted original key, derives an authentication key based on the reproduced original key held in the first volatile memory, identification information of the authenticating apparatus, and identification information of the authentication-target apparatus, and generates the response data based on the challenge data received from the authenticating apparatus and the authentication key, and the authenticating apparatus comprises:

a second non-volatile memory that stores an authentication original key serving as a source for deriving the authentication key; and a second processor that derives the authentication key based on identification information of the authentication-target apparatus and the authentication original key stored in the second non-volatile memory, generates response data for verification based on the challenge data and the authentication key derived by the second processor, and obtains an authentication result based on the response data transmitted from the authentication-target apparatus and the response data for verification, wherein the authentication-target apparatus deletes the reproduced original key held in the first volatile memory when the authentication key is derived by the first processor, wherein the authenticating apparatus is an image forming device, and the authentication-target apparatus is a replaceable component or a consumable that can be attached to and removed from the image forming device, and wherein the replaceable component or the consumable is allowed to operate in response to the obtained authentication result being successful.

16. The authentication system according to claim 15, wherein the first processor generates key data equivalent to the authentication original key by concatenating, and then inputting to a first one-way function, the reproduced original key held in the first volatile memory and the identification information of the authenticating apparatus received from the authenticating apparatus, and further derives the authentication key from the key data and the identification information of the authentication-target apparatus.

17. The authentication system according to claim 16, wherein the first processor derives the authentication key by concatenating, and then inputting to a second one-way function, the key data and the identification information of the authentication-target apparatus.

18. The authentication system according to claim 15, wherein the first processor generates key data equivalent to the authentication original key by inputting, to a first one-way function, the reproduced original key held in the first volatile memory as a key parameter and the identification information of the authenticating apparatus received from the authenticating apparatus as plaintext, and further derives the authentication key from the key data and the identification information of the authentication-target apparatus.

19. The authentication system according to claim 18, wherein the first processor derives the authentication key by inputting, to a second one-way function, the key data as a key parameter and the identification information of the authentication-target apparatus as plaintext.

20. An authentication-target apparatus for transmitting, to an authenticating apparatus, response data corresponding to challenge data transmitted from the authenticating apparatus, the authentication-target apparatus comprising:
a first non-volatile memory that stores a secret key of the authentication-target apparatus and an encrypted original key generated by encrypting an original key using the secret key;
a first decryptor that reproduces the original key, which was used to generate the encrypted original key, by decrypting the encrypted original key using the secret key stored in the first non-volatile memory;
a first volatile memory that temporarily holds the reproduced original key obtained by the first decryptor;
a first random number generator that generates a random number;
a first encryptor that generates a new encrypted original key by obtaining a copy of the reproduced original key held by the first volatile memory and encrypting the copy of the reproduced original key obtained from the first volatile memory using the random number as a new secret key; and a first processor configured to:
update the secret key and the encrypted original key stored in the first non-volatile memory using the new secret key and the new encrypted original key;
derive an authentication key based on the reproduced original key held in the first volatile memory, identification information of the authenticating apparatus, and identification information of the authentication-target apparatus; and
generate the response data based on the challenge data received from the authenticating apparatus and the authentication key derived by the first processor,
wherein the authenticating apparatus comprises:
a second non-volatile memory that stores a secret key of the authenticating apparatus and an encrypted original key generated by encrypting an original key using the secret key;
a second decryptor that reproduces the original key, which was used to generate the encrypted original key stored in the second non-volatile memory, by decrypting the encrypted original key using the secret key stored in the second non-volatile memory;
a second volatile memory that temporarily holds the reproduced original key obtained by the second decryptor;
a second random number generator that generates a random number;
a second encryptor that generates a new encrypted original key by obtaining a copy of the reproduced original key held by the second volatile memory and encrypting the copy of the reproduced original key obtained from the second volatile memory using the random number generated by the second random number generator as a new secret key; and
a second processor configured to:
update the secret key and the encrypted original key stored in the second non-volatile memory using the new secret key and the new encrypted original key;
derive an authentication key based on the reproduced original key held in the second volatile memory, identification information of the authenticating apparatus, and identification information of the authentication-target apparatus;
generate response data for verification based on the challenge data and the authentication key derived by the second processor; and
obtain an authentication result based on the response data transmitted from the authentication-target apparatus and the response data for verification,
wherein the authentication-target apparatus deletes the reproduced original key held in the first volatile memory when the authentication key is derived by the first processor,
wherein the authenticating apparatus is an image forming device, and the authentication-target apparatus is a replaceable component or a consumable that can be attached to and removed from the image forming device, and
wherein the replaceable component or the consumable is allowed to operate in response to the obtained authentication result being successful.

21. An authentication-target apparatus for transmitting, to an authenticating apparatus, response data corresponding to challenge data transmitted from the authenticating apparatus, the authentication-target apparatus comprising:

a first non-volatile memory that stores a secret key of the authentication-target apparatus and an encrypted original key generated by encrypting an original key using the secret key;

a first decryptor that reproduces the original key, which was used to generate the encrypted original key, from the secret key and the encrypted original key stored in the first non-volatile memory;

a first volatile memory that temporarily holds the reproduced original key obtained by the first decryptor;

a first random number generator that generates a random number;

a first encryptor that generates a new encrypted original key by obtaining a copy of the reproduced original key held by the first volatile memory and encrypting the copy of the reproduced original key obtained from the first volatile memory using the random number as a new secret key; and a first processor configured to:

update the secret key and the encrypted original key stored in the first non-volatile memory using the new secret key and the new encrypted original key;

derive an authentication key based on the reproduced original key held in the first volatile memory, identification information of the authenticating apparatus, and identification information of the authentication-target apparatus; and generate the response data based on the challenge data received from the authenticating apparatus and the authentication key, wherein the authenticating apparatus comprises:

a second non-volatile memory that stores an authentication original key serving as a source for deriving the authentication key; and a second processor configured to:

derive the authentication key based on identification information of the authentication-target apparatus and the authentication original key stored in the second non-volatile memory;

generate response data for verification based on the challenge data and the authentication key derived by the second processor; and obtain an authentication result based on the response data transmitted from the authentication-target apparatus and the response data for verification, wherein the authentication-target apparatus deletes the reproduced original key held in the first volatile memory when the authentication key is derived by the first processor, wherein the authenticating apparatus is an image forming device, and the authentication-target apparatus is a replaceable component or a consumable that can be attached to and removed from the image forming device, and wherein the replaceable component or the consumable is allowed to operate in response to the obtained authentication result being successful.

* * * * *